(12) United States Patent
Swamy et al.

(10) Patent No.: US 11,327,675 B2
(45) Date of Patent: May 10, 2022

(54) DATA MIGRATION

(71) Applicant: ACCENTURE GLOBAL SOLUTIONS LIMITED, Dublin (IE)

(72) Inventors: Jayant Swamy, Bangalore (IN); Aniruddha Ray, Bangalore (IN); Anshul Pandey, Bangalore (IN); Ritesh Padmanabhan Iyer, Bangalore (IN); Rahul Das, Bangalore (IN); Manish Shandhil, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 378 days.

(21) Appl. No.: 16/721,553

(22) Filed: Dec. 19, 2019

(65) Prior Publication Data

US 2020/0233600 A1 Jul. 23, 2020

(30) Foreign Application Priority Data

Jan. 23, 2019 (IN) .............................. 201911002830

(51) Int. Cl.
  *G06F 3/06* (2006.01)
  *G06N 20/00* (2019.01)
  (Continued)

(52) U.S. Cl.
  CPC ............ *G06F 3/0647* (2013.01); *G06F 3/067* (2013.01); *G06F 3/0607* (2013.01);
  (Continued)

(58) Field of Classification Search
  USPC .......... 707/661–673, 809–811; 711/154, 161
  See application file for complete search history.

(56) References Cited

U.S. PATENT DOCUMENTS

2006/0288048 A1* 12/2006 Kamohara ............ G06F 16/119
2012/0011308 A1* 1/2012 Asano ................... G06F 3/0649
  711/E12.008
(Continued)

OTHER PUBLICATIONS

Maja Vukovic et al., "Cloud migration using automated planning", NOMS 2016, 2016 IEEE/IFIP Network Operations and Management Symposium, Apr. 1, 2016, pp. 96-103.
(Continued)

*Primary Examiner* — Ilwoo Park
(74) *Attorney, Agent, or Firm* — Mannava & Kang, P.C.

(57) ABSTRACT

Examples of a data migration system are provided. The system may receive a data migration requirement. The system may sort the data stored in the on-premise data warehouse into a plurality of data domains. The system may map the plurality of data domains to a usage parameter index and a storage parameter index to determine a data usage pattern and a data storage pattern. The system may evaluate the data storage pattern and the data usage pattern to determine a data assessment index. The system may determine a data migration index from mapping a plurality of cloud platforms to the data assessment index. The system may determine a data migration model compatible with the data assessment index. The system may generate a data migration output comprising the layout for transferring data stored in the on-premise data warehouse to a compatible cloud platform to resolve the data migration requirement.

20 Claims, 30 Drawing Sheets

(51) Int. Cl.
    *G06F 16/23*           (2019.01)
    *G06F 16/21*           (2019.01)
    *G06F 16/28*           (2019.01)

(52) U.S. Cl.
    CPC ............ *G06F 16/214* (2019.01); *G06F 16/23* (2019.01); *G06F 16/283* (2019.01); *G06N 20/00* (2019.01)

(56) References Cited

U.S. PATENT DOCUMENTS

| | | | |
|---|---|---|---|
| 2016/0139852 A1 | 5/2016 | Huang et al. | |
| 2018/0373722 A1* | 12/2018 | Ulasen | G06N 3/0445 |
| 2019/0079940 A1* | 3/2019 | Krishnan | G06F 16/119 |
| 2021/0216350 A1* | 7/2021 | Ito | G06F 9/5038 |

OTHER PUBLICATIONS

S Venkata Prasad et al., "Performance Analysis of improvement in Clustered Data Migration using Machine Learning Approaches", Interenational Journal of Applied Engineering Research ISSN 0973-4562, vol. 13, No. 13, pp. 11316-11323.

\* cited by examiner

Accuracy Summary Report for Strategy training Data set:

| | precision | recall | f1-score | support |
|---|---|---|---|---|
| Design | 0.81 | 0.82 | 0.81 | 208 |
| Extend | 0.49 | 0.72 | 0.58 | 137 |
| Modernize | 0.82 | 0.27 | 0.41 | 99 |
| accuracy | | | 0.67 | 444 |
| macro avg | 0.71 | 0.60 | 0.60 | 444 |
| weighted avg | 0.71 | 0.67 | 0.65 | 444 |

| Label | Domestic Data Supply Chain | Disrupted Use Pattern Chain | Artificial Intelligence | Vendor Interoperability | Vendor | Backup Services | Storage & Compute | Violations | Cloud Administration | Geographic Presence |
|---|---|---|---|---|---|---|---|---|---|---|
| AWS | 1 | 3 | 1 | 3 | 2 | 1 | 1 | 3 | 1 | 1 |
| AWS | 2 | 3 | 3 | 2 | 2 | 1 | 3 | 3 | 2 | 1 |
| Azure | 2 | 2 | 2 | 3 | 3 | 2 | 3 | 3 | 3 | 1 |
| Azure | 1 | 3 | 1 | 1 | 1 | 3 | 1 | 1 | 1 | 1 |
| GCP | 3 | 1 | 1 | 3 | 3 | 2 | 3 | 1 | 2 | 3 |
| IBM | 2 | 3 | 1 | 1 | 1 | 3 | 1 | 3 | 2 | 3 |
| IBM | 3 | 1 | 3 | 2 | 2 | 2 | 2 | 3 | 3 | 1 |
| GCP | 1 | 1 | 2 | 3 | 3 | 2 | 2 | 1 | 3 | 3 |
| AWS | 1 | 2 | 3 | 1 | 1 | 3 | 1 | 1 | 1 | 3 |
| AWS | 1 | 3 | 2 | 2 | 2 | 1 | 2 | 2 | 1 | 2 |
| AWS | 2 | 1 | 3 | 1 | 1 | 1 | 1 | 2 | 3 | 2 |
| GCP | 2 | 2 | 1 | 3 | 3 | 2 | 2 | 1 | 2 | 3 |
| Azure | 3 | 3 | 1 | 1 | 3 | 1 | 3 | 1 | 3 | 3 |
| Azure | 2 | 1 | 2 | 2 | 3 | 2 | 1 | 1 | 2 | 3 |

1600D

| Data Domain Reports | Electoral Data | Data Retention | Business Requirement | Precision | Data Monetization | Artificial Intelligence | Data Analytics Use Pattern | Data Supply Chain | Label |
|---|---|---|---|---|---|---|---|---|---|
| 2 | 3 | 2 | 1 | 2 | 1 | 1 | 2 | 1 | Data Warehouse |
| 3 | 2 | 3 | 3 | 3 | 2 | 3 | 2 | 1 | Data Warehouse |
| 2 | 3 | 1 | 3 | 3 | 2 | 1 | 3 | 1 | Data Warehouse |
| 2 | 2 | 2 | 2 | 1 | 2 | 2 | 1 | 1 | Data Warehouse |
| 3 | 1 | 3 | 2 | 2 | 3 | 2 | 3 | 3 | Data Warehouse |
| 1 | 3 | 1 | 1 | 3 | 3 | 1 | 3 | 1 | Data Lake |
| 2 | 1 | 2 | 3 | 2 | 3 | 3 | 3 | 3 | Hybrid |
| 3 | 2 | 2 | 3 | 3 | 2 | 1 | 1 | 3 | Hybrid |
| 1 | 3 | 3 | 1 | 2 | 1 | 1 | 3 | 1 | Data Lake |
| 3 | 3 | 3 | 2 | 1 | 2 | 1 | 1 | 1 | Data Warehouse |
| 3 | 2 | 2 | 1 | 1 | 1 | 1 | 2 | 2 | Data Lake |
| 2 | 1 | 3 | 2 | 1 | 3 | 2 | 1 | 2 | Hybrid |
| 1 | 3 | 3 | 2 | 2 | 1 | 1 | 1 | 3 | Data Warehouse |
| 2 | 2 | 2 | 1 | 2 | 2 | 2 | 2 | 1 | Data Lake |

Accuracy Summary Report for Technical Pattern Training Data set:

|  | precision | recall | f1-score | support |
|---|---|---|---|---|
| Data Lake | 0.69 | 0.87 | 0.77 | 221 |
| Data Warehouse | 0.89 | 0.84 | 0.86 | 269 |
| Hybrid | 0.89 | 0.61 | 0.73 | 135 |
| accuracy |  |  | 0.80 | 625 |
| macro avg | 0.82 | 0.77 | 0.79 | 625 |
| weighted avg | 0.82 | 0.80 | 0.80 | 625 |

| Availability | Concurrency | Data Cleans | Data Loading | Database Management | Basic Data Transformations | Geospatial Analysis | Queries and reports | Storage | XML support | Load |
|---|---|---|---|---|---|---|---|---|---|---|
| 3 | 3 | 1 | 1 | 1 | 2 | 2 | 1 | 2 | 1 | Traditional |
| 3 | 1 | 1 | 2 | 3 | 1 | 3 | 3 | 2 | 3 | Traditional |
| 3 | 2 | 1 | 3 | 1 | 1 | 1 | 1 | 1 | 1 | Traditional |
| 2 | 2 | 1 | 2 | 2 | 1 | 3 | 2 | 3 | 2 | Traditional |
| 1 | 1 | 1 | 1 | 1 | 3 | 3 | 3 | 1 | 1 | MPP |
| 1 | 3 | 3 | 1 | 2 | 3 | 1 | 2 | 1 | 3 | MPP |
| 2 | 3 | 1 | 3 | 2 | 2 | 3 | 1 | 1 | 1 | Native |
| 1 | 2 | 2 | 1 | 3 | 2 | 2 | 3 | 1 | 3 | MPP |
| 1 | 2 | 1 | 3 | 3 | 1 | 1 | 1 | 2 | 2 | Native |
| 3 | 1 | 2 | 3 | 3 | 3 | 3 | 3 | 3 | 3 | MPP |
| 3 | 1 | 1 | 1 | 2 | 2 | 1 | 2 | 1 | 1 | Native |
| 2 | 2 | 2 | 2 | 1 | 3 | 1 | 3 | 2 | 3 | MPP |
| 2 | 2 | 2 | 1 | 3 | 2 | 3 | 2 | 2 | 2 | Native |
| 1 | 2 | 2 | 2 | 2 | 2 | 3 | 2 | 2 | 3 | MPP |
| 1 | 1 | 2 | 1 | 3 | 3 | 3 | 2 | 2 | 1 | Native |

1600H

Accuracy Summary Report for Data Warehouse Training Data set **

|  | precision | recall | f1-score | support |
|---|---|---|---|---|
| Cloud Native | 0.80 | 0.87 | 0.83 | 269 |
| MPP | 0.66 | 0.37 | 0.47 | 164 |
| Traditional | 0.57 | 0.72 | 0.63 | 192 |
| accuracy |  |  | 0.69 | 625 |
| macro avg | 0.68 | 0.65 | 0.65 | 625 |
| weighted avg | 0.69 | 0.69 | 0.68 | 625 |

Accuracy Summary Report for Data Lake Training Data set to predict different Third party labels:

|  | precision | recall | f1-score | support |
|---|---|---|---|---|
| Cloudera | 0.86 | 0.94 | 0.90 | 265 |
| Hortonworks | 0.75 | 0.74 | 0.75 | 161 |
| MapR | 0.77 | 0.68 | 0.72 | 199 |
| accuracy |  |  | 0.80 | 625 |
| macro avg | 0.79 | 0.79 | 0.79 | 625 |
| weighted avg | 0.80 | 0.80 | 0.80 | 625 |

|  | Actual | |
|---|---|---|
|  | Positive | Negative |
| Predicted Positive | True Positive | False Positive |
| Predicted Negative | False Negative | True Negative |

DATA MIGRATION

PRIORITY CLAIM

This application claims priority to Indian provisional patent application 201911002830 filed on Jan. 23, 2019, the disclosure of which is incorporated by reference in its entirety herein.

BACKGROUND

As data for organizations has increased in terms of size and complexity, organizations are increasingly migrating their on-premise data to a cloud platform. The complexity of data stored and the need to be able to analyze the stored data quickly and from any location has made data migration to the cloud inevitable. However, with the advent of various cloud platforms and multiple data migration solutions, which may be available to an organization, the task of data migration to the cloud has become increasingly complex. Many technologists may be unaware of how to begin migrating data to the cloud. For example, a commonly encountered roadblock for technologists is the "Art of Start"; i.e., they are unaware of how to even begin the data migration from an on-premise platform to a cloud platform. Furthermore, existing approaches for data migration to a cloud platform may not offer a comprehensive and holistic approach towards cloud migration.

For example, existing techniques may evaluate options based on a piecemeal approach and may not provide techniques that may be reusable for future cloud migration needs. The piecemeal approach may not prioritize data for migration, which may inevitably leave a high priority data on-premise and instead migrate a low priority data to the cloud platform. Additionally, existing techniques may lead to an inappropriate platform selection leading to a high cost of ownership, and ill achievement of desired features & business agility.

Therefore, to ensure effectiveness, efficiency and completeness, both qualitatively and quantitatively, a data migration system may be required to ensure that technologists may effectuate a data migration project from an on-premise database to a cloud platform while keeping various parameters in mind. For example, the parameters may pertain to evaluating current on-premise data storage solution for an organization, evaluating the various tools and systems available for migrating the data and storing the data on the cloud platform; and choosing the appropriate data migration tool(s) and the appropriate cloud storage system(s). Furthermore, there is a need for tools that utilize machine learning techniques to efficiently analyze data, choose the right cloud platform based on the analysis, and formulate a data migration plan to effectuate the data migration using minimal computing resources and also reduce the time needed to perform the task of data migration.

Accordingly, a technical problem with the currently available systems for data migration is that they may be inefficient, inaccurate, and/or not scalable. There is a need for a data migration system that may account for the various factors mentioned above, amongst others, to generate a data migration roadmap in an efficient and cost-effective manner.

BRIEF DESCRIPTION OF DRAWINGS

Figure 11:
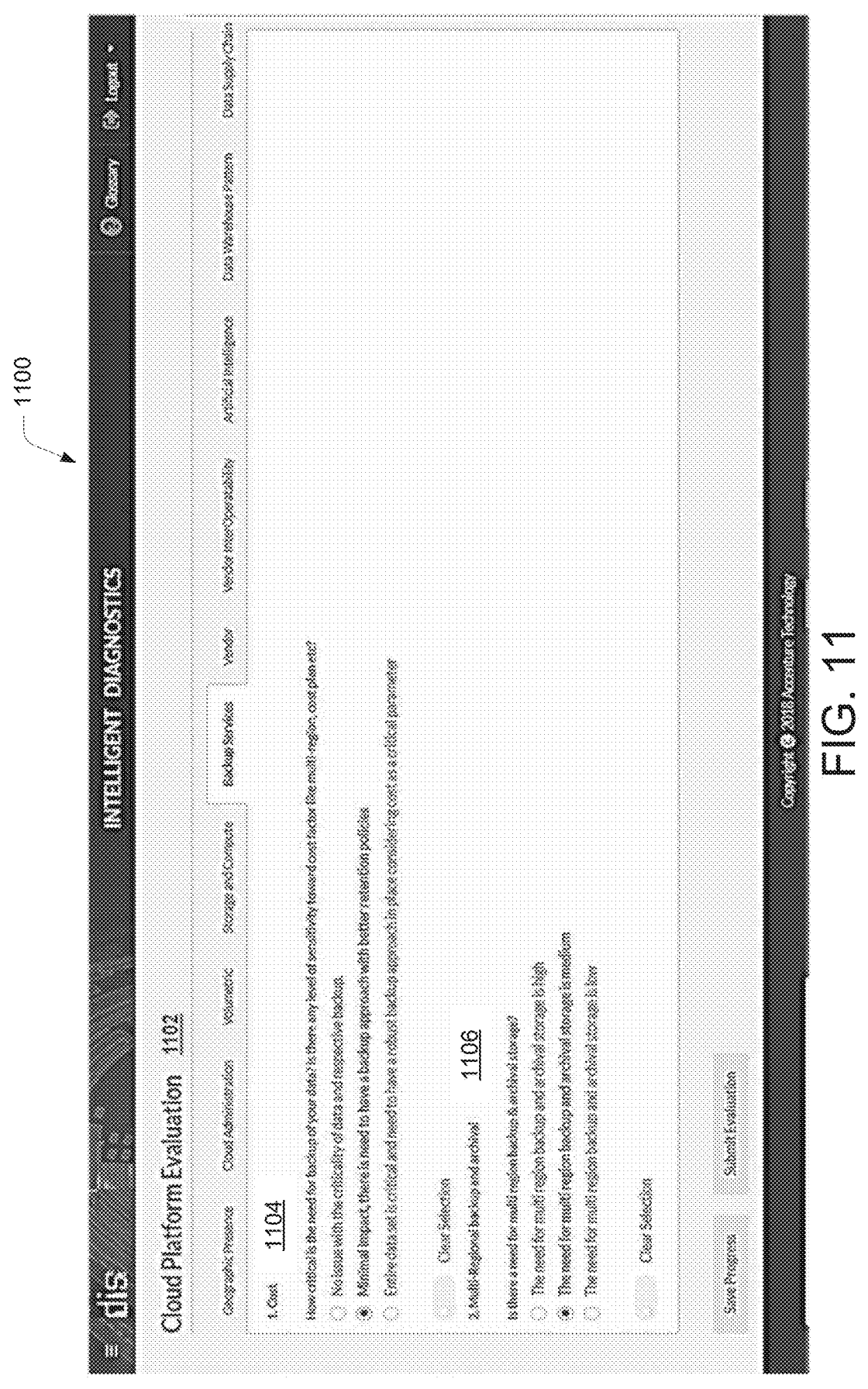

FIG. 11 illustrates a pictorial representation of an evaluation of a cloud platform generated by deploying a data migration system, according to an example embodiment of the present disclosure.

Figure 16B:
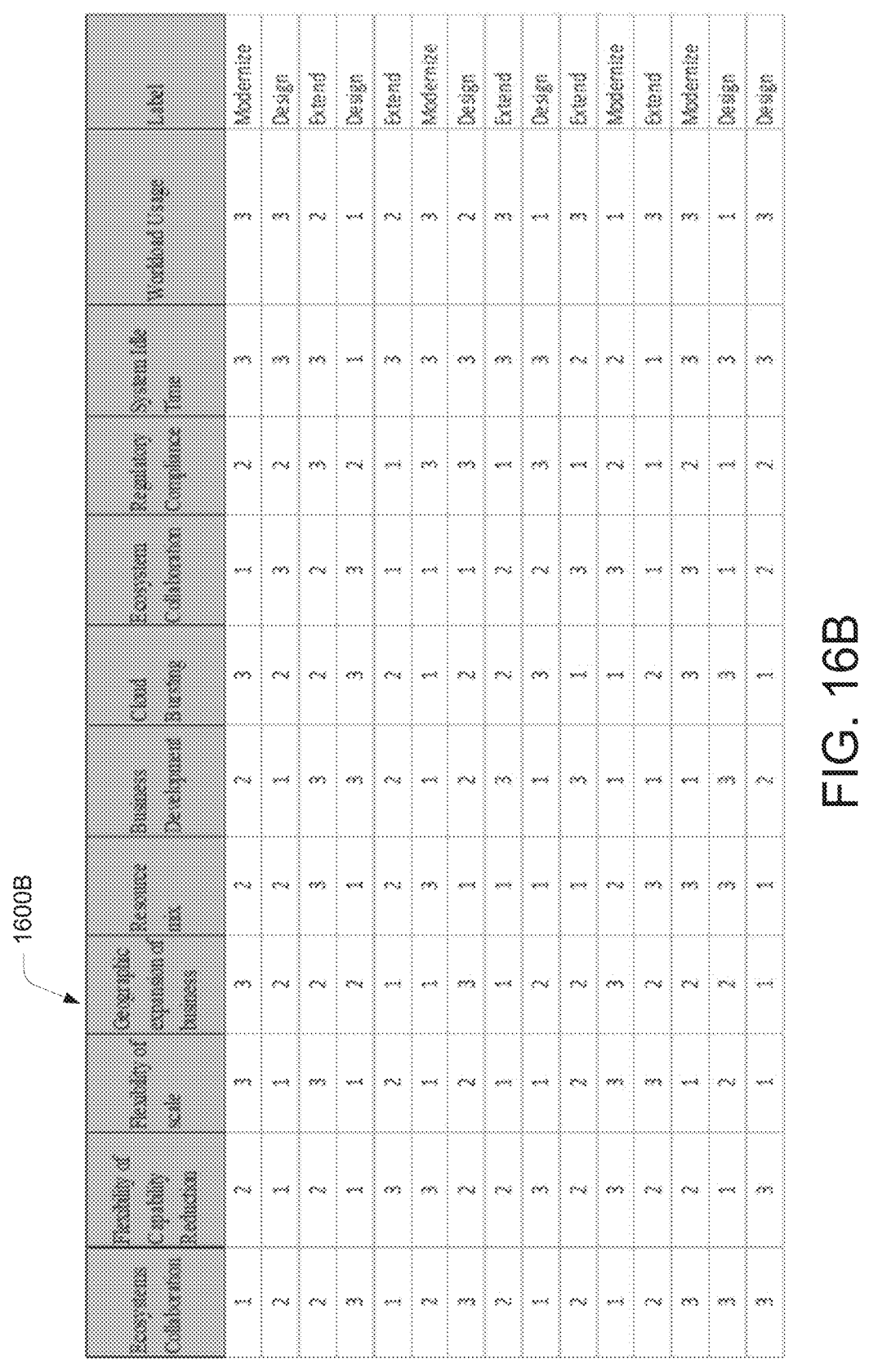

FIG. 16B illustrates a pictorial representation of the working of a data migration system at a strategy profile generation stage for processing a data migration requirement, according to an example embodiment of the present disclosure.

FIG. 16C illustrates a pictorial representation of the working of a data migration system at a strategy profile generation stage for processing a data migration requirement, according to an example embodiment of the present disclosure.

FIG. 16D illustrates a pictorial representation of the working of a data migration system at a cloud profile generation stage for processing a data migration requirement, according to an example embodiment of the present disclosure.

FIG. 16F illustrates a pictorial representation of the working of a data migration system at a technical platform profile generation stage for processing a data migration requirement, according to an example embodiment of the present disclosure.

FIG. 16G illustrates a pictorial representation of the working of a data migration system at a technical platform profile generation stage for processing a data migration requirement, according to an example embodiment of the present disclosure.

FIG. 16H illustrates a pictorial representation of the working of a data migration system at a data warehouse profile generation stage for processing a data migration requirement, according to an example embodiment of the present disclosure.

FIG. 16I illustrates a pictorial representation of the working of a data migration system at a data warehouse profile generation stage for processing a data migration requirement, according to an example embodiment of the present disclosure.

FIG. 16K illustrates a pictorial representation of the working of a data migration system at a data lake profile generation stage for processing a data migration requirement, according to an example embodiment of the present disclosure.

FIG. 16L illustrates a pictorial representation of a classification model deployed by a data migration system for a data migration process, according to an example embodiment of the present disclosure.

DETAILED DESCRIPTION

Figure 1:
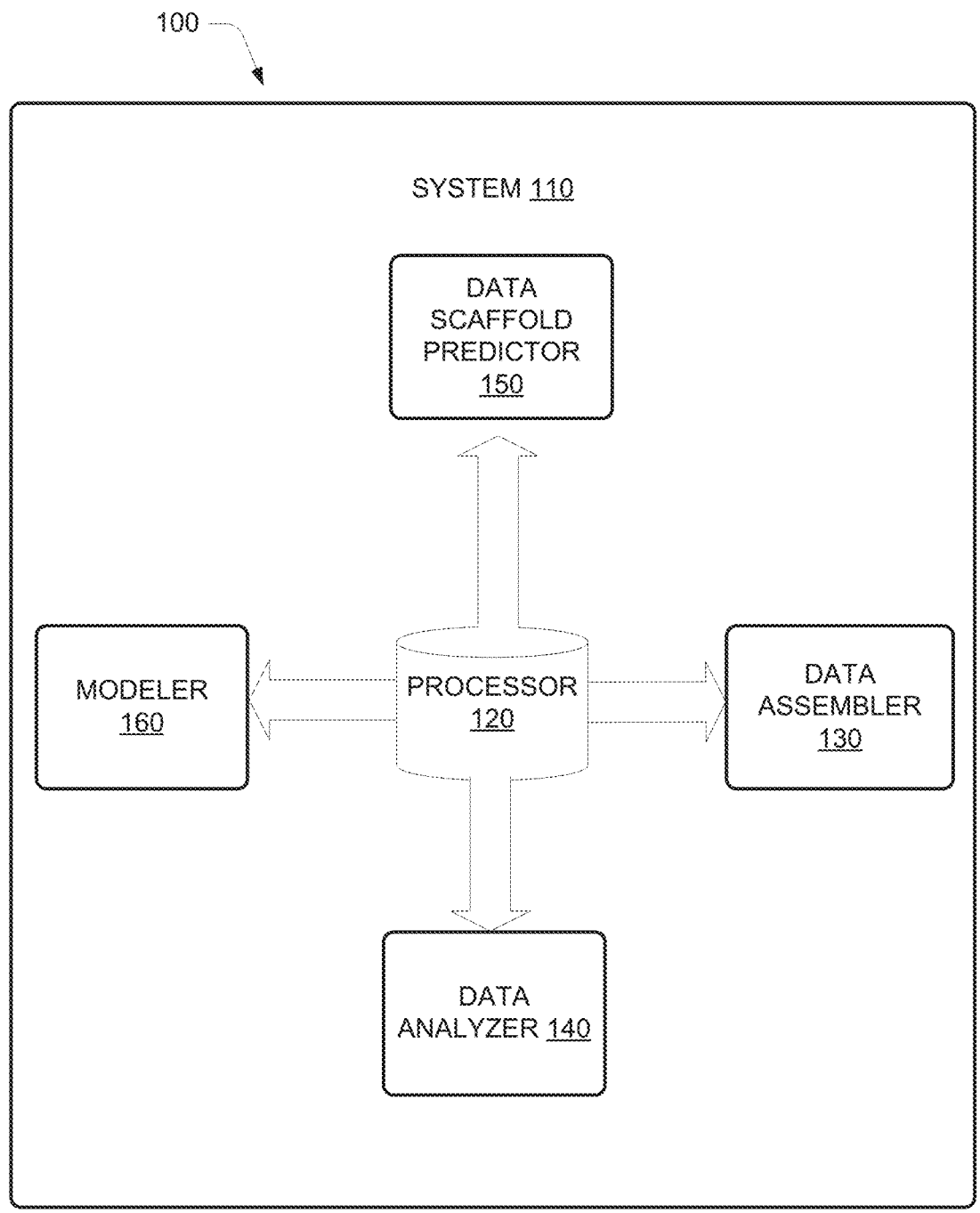
FIG. 1 illustrates a diagram for a data migration system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for data migration including a data migration system (DMS). The data migration system (referred to as "system" hereinafter) may be used to by an organization to analyze a current data landscape, capture organizational requirements, strategize cloud adoption and arrive at detailed target technical architecture suitable for the context of data migration for the organization. The system may enable an organization to select appropriate data to be moved to a cloud platform from a complex on-premise data ecosystem. The system may select a cloud platform compatible with the selected data. The system may recommend a location over the selected cloud platform for data migration, using an optimal mix of data migration techniques compatible with the target on-premise data of an organization. The system may be equipped with various machine learning components for catering to a wide spectrum of scenarios, which may arise during a data migration process. In an example, the system may enable an organization to asses and plan the movement of their data and infrastructure to a cloud platform within 8-10 weeks.

The system may include a processor, a data assembler, a data analyzer, a data migration predictor, and a modeler. The processor may be coupled to the data assembler, the data analyzer, the data migration predictor, and the modeler. The data assembler may receive a data migration requirement associated with data stored in an on-premise data warehouse. The data assembler may sort the data stored in the on-premise data warehouse into a plurality of data domains. Each of the plurality of data domains may be pertaining to an attribute associated with the data migration requirement. The data analyzer may map the plurality of data domains to a usage parameter index to determine a data usage pattern comprising a plurality of data usage parameters associated with the data migration requirement. The usage parameter index may be comprising a usage parameter set associated with the data stored in the on-premise data warehouse.

The data analyzer may map the plurality of data domains to a storage parameter index to determine a data storage pattern comprising a plurality of data storage parameters associated with the data migration requirement. The storage parameter index may be comprising a storage parameter set associated with the data stored in the on-premise data warehouse. The data migration predictor may evaluate the data storage pattern and the data usage pattern to determine a data assessment index comprising an assessment parameter set associated with the data migration requirement. The data migration predictor may determine a data migration index based on a mapping a plurality of cloud platforms to the data assessment index. The data migration index may be comprising each of the plurality of cloud platforms mapped to the data assessment index. The modeler may implement a second cognitive learning operation to determine a data migration model compatible with the data assessment index, based on the data migration index. The data migration model may be comprising a layout for transferring data stored in the on-premises data warehouse to a cloud platform from the plurality of cloud platforms. The modeler may generate a data migration output comprising the layout for transferring data stored in the on-premises data warehouse to a compatible cloud platform from the plurality of cloud platforms to resolve the data migration requirement.

The embodiments for the data migration requirement presented herein are exemplary in nature and should be treated as such. For the sake of brevity and technical clarity, the description of the data migration system may be restricted to few exemplary embodiments, however, to a person skilled in the art it should be clear that the system may be used for the fulfillment of various data migration requirements other than those mentioned hereinafter.

Accordingly, the present disclosure aims to provide a data migration system for adopting a holistic and streamlined approach to assess, inspect and recommend various cloud platforms and data migration techniques, to migrate on-premise data of an organization to an appropriate cloud platform. Furthermore, the present disclosure may categorically analyze various parameters for expediting data migration from the on-premise data warehouse to a compatible cloud platform.

FIG. 1 illustrates a system for data migration system 110 (referred to as system 110 hereinafter), according to an example implementation of the present disclosure. In an example, the system 110 may include a processor 120. The processor 120 may be coupled to a data assembler 130, a data analyzer 140, a data migration predictor 150, and a modeler 160.

In accordance with an embodiment of the present disclosure, the data assembler 130 may receive a data migration requirement. The data migration requirement may be associated with data stored in an on-premise data warehouse. The on-premise data warehouse may refer to data servers installed locally, on an organization's own computers and servers.

The data migration requirement may be a requirement sent by a user to the system 110 for a purpose of migrating data from the on-premise data warehouse to a cloud platform due to various issues that may be inherent to the management of data stored in an on-premise data warehouse. For example, the data stored in on-premise data warehouse may have an Inflexible architecture, which may inhibit further innovation and agile development in an organization. The data stored in on-premise data warehouse may exhibit poor scalability thereby preventing optimization of organizational resources. The on-premise data warehouse may present integration issues leading to creation of data silos. The on-premise data warehouse may prove to be expensive in terms of storage leading to cost inefficiency. The on-premise data warehouse may not be to handle new data types. The data stored in on-premise data warehouse may suffer from limited reporting & analytics capability. In accordance with various embodiments of the present disclosure, the purpose of the data migration requirement may be associated with migration of data stored in on-premise data warehouse to a cloud platform to establish an efficient data supply chain that may have many advantages. For example, an efficient data supply chain may provide a hybrid architecture providing an option to select fit-for-purpose technologies for business agility and speed to insights. An efficient data supply chain may provide rapid insights discovery through data exploration and pattern finding. An efficient data supply chain may provide extensive analytics capabilities through greater use of techniques like data searching, Natural Language Processing (NLP), Structured Query Language (SQL) and other tools for data preparation. An efficient data supply chain may provide digital de-coupling of data to enable data as a service via various micro-service workbench, API and gateways. An efficient data supply chain may provide cost-efficient storage, scalability and high availability of data management systems.

The data assembler 130 may sort the data stored in the on-premise data warehouse into a plurality of data domains, wherein each of the plurality of data domains may be pertaining to an attribute associated with the data migration requirement. The attribute may a measurable factor associated with the data migration requirement. In an example, the attribute may be data type, data priority, data linkages, and the link. In an example, each of the plurality of data domains may be pertaining to a single attribute. The data assembler 130 may implement a series of category intelligence operations for sorting the on-premise data warehouse into the plurality of data domains. In an example, the series of category intelligence operations may include identification of all measurable factors associated with the purpose of the data migration requirement. For example, the category intelligence operations may include a data extractor, a data classifier, a data associator, a data comparer, a relationship extractor, and a dependency parser and the like. The plurality of data domains and associated attributes may present a data scaffold, which may be used for processing the data migration requirement. In accordance with various embodiments of the present disclosure, the attributes may include identification of stakeholders, detailed schedule of workshops/meetings to be conducted for processing the data migration requirement, acceptance criteria of various activities to undertaken for processing the data migration requirement, an engagement plan for resolving the data migration requirement, and the like. In an example, each attribute may be construed as a measurable factor relevant to processing the data migration requirement.

The data analyzer 140 may map the plurality of data domains to a usage parameter index to determine a data usage pattern comprising a plurality of data usage parameters associated with the data migration requirement. The data usage pattern may be a complete study of an organization's data landscape (explained in detail by way of subsequent FIGS.). The usage parameter index may be comprising a usage parameter set associated with the data stored in an on-premise data warehouse. The usage parameter set may refer to a set of measurable factors that may be deployed by the data analyzer 140 for measuring the data usage pattern of an organization. The usage parameter set may include for example, information related to an organizational database, technical architecture of the organizational database, data intelligence associated with the organizational database, operating system or a middleware associated with the organizational database associated with the organizational database, technical details associated with the organizational database, data compliance, self-healing capabilities associated with the organizational database, data infrastructure associated with the organizational database, application server associated with the organizational database, data archival & latency associated with the organizational database, complexity of various data extraction processes associated with the organizational database, and the like. In an example, each parameter from the usage parameter set may be a part of the usage parameter index. The data analyzer 140 may map the plurality of data domains with the usage parameter set to generate the data usage pattern (explained in further detail by way of subsequent FIGS.). The data usage pattern may be comprising the plurality of data usage parameters. In accordance with various embodiments of the present disclosure, the plurality of data usage parameters may refer to the usage parameter set after being mapped with the plurality of data domains. The plurality of data usage parameters may include information related to an organizational database, technical architecture of the organizational database, data intelligence associated with the organizational database, operating system or a middleware associated with the organizational database associated with the organizational database, technical details associated with the organizational database, data compliance, self-healing capabilities associated with the organizational database, data infrastructure associated with the organizational database, application server associated with the organizational database, data archival & latency associated with the organizational database, complexity of various data extraction processes associated with the organizational database, and the like relevant to the data migration requirement.

The data analyzer 140 may map the plurality of data domains to a storage parameter index to determine a data storage pattern comprising a plurality of data storage parameters associated with the data migration requirement. The data storage pattern may be a study of the data storage landscape of an organization (explained later in detail by way of subsequent FIGS.). The data storage pattern may include identification of required storage pattern. For example, the data storage pattern may include identification of requirement of a data lake, a data warehouse or a hybrid architecture for processing the data migration requirement. The storage parameter index may be comprising a storage parameter set associated with the data stored in an on-premise data warehouse. The storage parameter set may refer to a set of measurable factors that may be deployed by the data analyzer 140 for measuring data storage pattern of an organization. In accordance with various embodiments of the present disclosure, the storage parameter set may include mapping unused data for an organization, mapping utilized data storage space based on a defined line of business for an organization, mapping performance of various data users across and organization, and the like. The data analyzer 140 may map the plurality of data domains with the storage parameter set to generate the data storage pattern (explained in further detail by way of subsequent FIGS.). In accordance with various embodiments of the present disclosure, the plurality of data storage parameters may refer to the storage parameter set after being mapped with the plurality of data domains.

In accordance with various embodiments of the present disclosure, the data analyzer 140 may generate a usage questionnaire based on the usage parameter set and a storage questionnaire based on the storage parameter set to map the plurality of data domains to the data usage index and the data storage index, respectively. The usage questionnaire may include various questions generated by the system 110 for a user of the system for facilitating the determination of the data usage pattern. For example, the usage questionnaire may include questions related to any of the usage parameter set. The storage questionnaire may include various questions generated by the system 110 for a user of the system for facilitating the determination of the data storage pattern. In an example, the storage questionnaire may include questions related to the storage parameter set. The data analyzer 140 may create a questionnaire library for recording the usage questionnaire and the storage questionnaire. The questionnaire library may be deployed to update the usage parameter index and the storage parameter index. For example, the usage questionnaire may lead an insight regarding the data usage in an organization, the system 110 may catalog the insight and update the usage parameter index based on the insight. The updated usage parameter index may be used as a future reference for processing a current and any future data migration requirement by the organization.

In accordance with various embodiments of the present disclosure, the data analyzer 140 may assign a confidence value to each of the plurality of data domains based on the data migration requirement to determine an order of mapping the plurality of data domains with the usage parameter index and the storage parameter index, respectively. The confidence value may refer to a priority value that may be given to a domain from the plurality of data domains. A high priority value may indicate that the corresponding data domain may need to be migrated to the cloud platform ahead of other data domains from the plurality of data domains. A data domain from the plurality of data domains with a high confidence value may be mapped first with the usage parameter index and the storage parameter index. Additionally, a low priority value may indicate that the corresponding data domain may be migrated to the cloud platform at a later stage. The data analyzer 140 may assign the confidence value based on a response received from a user for the usage questionnaire and the storage questionnaire. For example, a user response may indicate which of the plurality of data domains may be of a high priority for processing the data migration requirement.

The system 110 may further include the data migration predictor 150. The data migration predictor 150 may implement a first cognitive learning operation to evaluate the data storage pattern and the data usage pattern to determine a data assessment index comprising an assessment parameter set associated with the data migration requirement. The first cognitive learning operation may include implementation of various machine learning techniques (explained later by way of Subsequent FIGS.), text mining techniques (explained later by way of Subsequent FIGS.) and generation of various questionnaires (explained later by way of Subsequent FIGS.) for evaluating the data storage pattern and the data usage pattern. The data assessment index may determine strategic drivers required for processing the data migration requirement. The data assessment index may include the assessment parameter set. The assessment parameter set may be a set of measurable factors for determining the strategic drivers required for processing the data migration requirement. The assessment parameter set may include parameters like ecosystem collaboration, flexibility of capability reduction, flexibility of scale, geographic expansion of business, resource mix, a volumetric analysis of data, data warehouse pattern, data supply chain, data storage & compute, data formats, data reports, historical data, data retention, data flexibility, data monetization and the like. In an example, the system 110 may generate the data usage pattern and the data storage pattern as an electronic document to a user. The system 110 may further receive a user input to the electronic document for determining the data assessment index. In an example, the assessment parameter set may be derived from the usage parameter set and the storage parameter set based on input received from a user of the system 110.

The data migration predictor 150 may determine a data migration index based on mapping a plurality of cloud platforms to the data assessment index. The data migration index may be comprising each of the plurality of cloud platforms mapped to the data assessment index. In an example, the plurality of cloud platforms may refer to the cloud platforms like AWS™, Azure™, GCP™, IBM™, and the like. The data migration index may include various parameters from the data assessment index mapped with each of the plurality of cloud platforms. The data migration predictor 150 may map the various parameters from the data assessment index mapped with each of the plurality of cloud platforms by implementing the first cognitive learning operation. The data migration index may include various models for data migration, wherein each model may be specific to a cloud platform from the plurality of cloud platforms.

The modeler 160 may implement a second cognitive learning operation to determine a data migration model compatible with the data assessment index, based on the data migration index. The modeler 160 may analyze the data migration index and determine a model for data migration, which may be compatible with the data usage pattern, and the data storage pattern of an organization. The data migration model may include recommendations for a data migration strategy, a cloud platform, a technical platform, a data warehouse type, and a data lake structure for processing the data migration requirement (explained in detail by way of subsequent FIGS.). The data migration model may be comprising a layout for transferring data stored in the on-premise data warehouse to a cloud platform from the plurality of cloud platforms. In an example, the modeler 160 may generate the data migration index as an interactive electronic document to receive a migration input from a user (explained in detail by way of subsequent FIGS.). The modeler 160 may implement the second cognitive learning operation on the migration input to determine the data migration model compatible with the data assessment index. Further, the modeler 160 may generate a data migration output comprising the layout for transferring data stored in the on-premise data warehouse to a compatible cloud platform from the plurality of cloud platforms to resolve the data migration requirement.

The embodiments for the first cognitive learning operation and the second cognitive learning operation presented herein are exemplary in nature and should be treated as such. The data migration system 110 presented herein may facilitate the preparation of roadmap for movement to cloud. The data migration system 110 may facilitate prioritizing data that may be moved to the cloud platform. The data migration system 110 may facilitate estimation & planning for migration of data from the on-premise data warehouse to the cloud platform. The data migration system 110 may augment a data discovery process by making data searching more effective. The data migration system 110 may facilitate in implementing data governance and quality process controls on the cloud platform. The data migration system 110 may facilitate a co-existence of the on-premise data and cloud data components. The data migration system 110 may prevent the implementation of a wrong data migration strategy, which may be leading to inflexibility and affecting data consumption. The data migration system 110 may prevent incorrect adoption of cloud patterns resulting in increased cycle time and cost inefficiency. The data migration system 110 may prevent inappropriate selection of data supply chain components leading to integration and performance issues. For the sake of brevity and technical clarity, the description of the data migration system 110 may be restricted to few exemplary embodiments, however, to a person skilled in the art it should be clear that the system may be used for the fulfillment of various data migration requirements other than those mentioned hereinafter.

Figure 2:
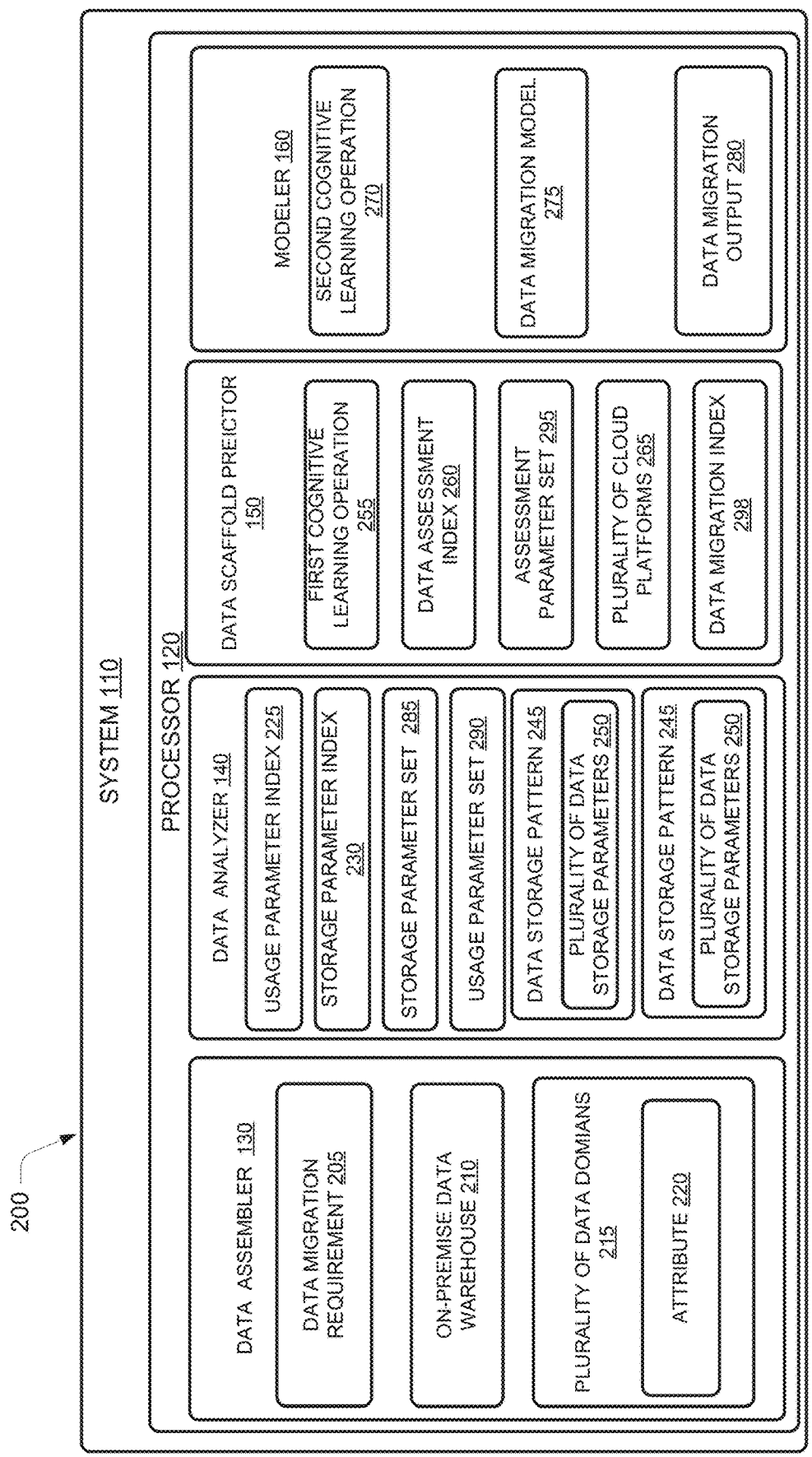
FIG. 2 illustrates various components of a data migration system, according to an example embodiment of the present disclosure.

FIG. 2 illustrates various components of a data migration system, according to an example embodiment of the present disclosure. The processor 120 may be coupled to the data assembler 130, the data analyzer 140, the data migration predictor 150, and the modeler 160.

In accordance with an embodiment of the present disclosure, the data assembler 130 may receive a data migration requirement 205. The data migration requirement 205 may be associated with data stored in an on-premise data warehouse 210. The on-premise data warehouse 210 may refer to data servers installed locally, on an organization's own computers and servers.

The data migration requirement 205 may be a requirement sent by a user to the system 110 for a purpose of migrating data from the on-premise data warehouse 210 to a cloud platform due to various issues that may be inherent to the management of data stored in on-premise data warehouse 210. For example, the data stored in on-premise data warehouse 210 may have an Inflexible architecture, which may inhibit further innovation and agile development in an organization. The data stored in on-premise data warehouse 210 may exhibit poor scalability thereby preventing optimization of organizational resources. The on-premise data warehouse 210 may present integration issues leading to the creation of data silos. The on-premise data warehouse 210 may prove to be expensive in terms of storage leading to cost inefficiency. The on-premise data warehouse 210 may not be to handle new data types. The data stored in on-premise data warehouse 210 may suffer from limited reporting & analytics capability. In accordance with various embodiments of the present disclosure, the purpose of the data migration requirement 205 may be associated with migration of data stored in on-premise data warehouse 210 to a cloud platform to establish an efficient data supply chain that may have many advantages. For example, an efficient data supply chain may provide a hybrid architecture providing an option to select fit-for-purpose technologies for business agility and speed to insights. An efficient data supply chain may provide rapid insights discovery through data exploration and pattern finding. An efficient data supply chain may provide extensive analytics capabilities through greater use of techniques like data searching, Natural Language Processing (NLP), Structured Query Language (SQL) and other tools for data preparation. An efficient data supply chain may provide digital de-coupling of data to enable data as a service via various micro-service workbench, API and gateways. An efficient data supply chain may provide cost-efficient storage, scalability and high availability of data management systems.

The data assembler 130 may sort the data stored in the on-premise data warehouse 210 into a plurality of data domains 215, wherein each of the plurality of data domains 215 may be pertaining to an attribute 220 associated with the data migration requirement 205. The attribute 220 may a measurable factor associated with the data migration requirement 205. In an example, the attribute 220 may be data type, data priority, data linkages, and the link. In an example, each of the plurality of data domains 215 may be pertaining to a single attribute 220. The data assembler 130 may implement a series of category intelligence operations for sorting the on-premise data warehouse 210 into the plurality of data domains 215. In an example, the series of category intelligence operations may include identification of all measurable factors associated with the purpose of the data migration requirement 205. For example, the category intelligence operations may include a data extractor, a data classifier, a data associator, a data comparer, a relationship extractor, and a dependency parser and the like. The plurality of data domains 215 and associated attributes 220 may present a data scaffold, which may be used for processing the data migration requirement 205. In accordance with various embodiments of the present disclosure, the attributes 220 may include identification of stakeholders, detailed schedule of workshops/meetings to be conducted for processing the data migration requirement 205, acceptance criteria of various activities to undertaken for processing the data migration requirement 205, an engagement plan for resolving the data migration requirement 205, and the like. In an example, each attribute 220 may be construed as a measurable factor relevant to processing the data migration requirement 205.

The data analyzer 140 may map the plurality of data domains 215 to a usage parameter index 225 to determine a data usage pattern 235 comprising a plurality of data usage parameters 240 associated with the data migration requirement 205. The data usage pattern 235 may be a complete study of an organization's data landscape (explained in detail by way of subsequent FIGS.). The usage parameter index 225 may be comprising a usage parameter set 290 associated with the data stored in an on-premise data warehouse 210. The usage parameter set 290 may refer to a set of measurable factors that may be deployed by the data analyzer 140 for measuring data usage pattern 235 of an organization. The usage parameter set 290 may include for example, information related to an organizational database, technical architecture of the organizational database, data intelligence associated with the organizational database, operating system or a middleware associated with the organizational database associated with the organizational database, technical details associated with the organizational database, data compliance, self-healing capabilities associated with the organizational database, data infrastructure associated with the organizational database, application server associated with the organizational database, data archival & latency associated with the organizational database, complexity of various data extraction processes associated with the organizational database, and the like. In an example, each parameter from the usage parameter set 290 may be a part of the usage parameter index 225. The data analyzer 140 may map the plurality of data domains 215 with the usage parameter set 290 to generate the data usage pattern 235 (explained in further detail by way of subsequent FIGS.). The data usage pattern 235 may be comprising the plurality of data usage parameters 240. In accordance with various embodiments of the present disclosure, the plurality of data usage parameters 240 may refer to the usage parameter set 290 after being mapped with the plurality of data domains 215. The plurality of data usage parameters 240 may include information related to an organizational database, technical architecture of the organizational database, data intelligence associated with the organizational database, operating system or a middleware associated with the organizational database associated with the organizational database, technical details associated with the organizational database, data compliance, self-healing capabilities associated with the organizational database, data infrastructure associated with the organizational database, application server associated with the organizational database, data archival & latency associated with the organizational database, complexity of various data extraction processes associated with the organizational database, and the like relevant to the data migration requirement 205.

The data analyzer 140 may map the plurality of data domains 215 to a storage parameter index 230 to determine a data storage pattern 245 comprising a plurality of data storage parameters 250 associated with the data migration requirement 205. The data storage pattern 245 may be a study of the data storage landscape of an organization (explained later in detail by way of subsequent FIGS.). The data storage pattern 245 may include identification of required storage pattern. For example, the data storage pattern 245 may include identification of requirement of a data lake, a data warehouse or a hybrid architecture for processing the data migration requirement 205. The storage parameter index 230 may be comprising a storage parameter set 285 associated with the data stored in an on-premise data warehouse 210. The storage parameter set 285 may refer to a set of measurable factors that may be deployed by the data analyzer 140 for measuring data storage pattern 245 of an organization. In accordance with various embodiments of the present disclosure, the storage parameter set 285 may include mapping unused data for an organization, mapping utilized data storage space based on a defined line of business for an organization, mapping performance of various data users across and organization, and the like. The data analyzer 140 may map the plurality of data domains 215 with the storage parameter set 285 to generate the data storage pattern 245 (explained in further detail by way of subsequent FIGS.). In accordance with various embodiments of the present disclosure, the plurality of data storage parameters may refer to the storage parameter set 285 after being mapped with the plurality of data domains 215.

In accordance with various embodiments of the present disclosure, the data analyzer 140 may generate a usage questionnaire based on the usage parameter set 290 and a storage questionnaire based on the storage parameter set 285 to map the plurality of data domains 215 to the data usage index and the data storage index, respectively. The usage questionnaire may include various questions generated by the system 110 for a user of the system for facilitating the determination of the data usage pattern 235. For example, the usage questionnaire may include questions related to any of the usage parameter set 290. The storage questionnaire may include various questions generated by the system 110 for a user of the system for facilitating the determination of the data storage pattern 245. In an example, the storage questionnaire may include questions related to the storage parameter set 285. The data analyzer 140 may create a questionnaire library for recording the usage questionnaire and the storage questionnaire. The questionnaire library may be deployed to update the usage parameter index 225 and the storage parameter index 230. For example, the usage questionnaire may lead an insight regarding the data usage in an organization, the system 110 may catalog the insight and update the usage parameter index 225 based on the insight. The updated usage parameter index 225 may be used as a future reference for processing a current and any future data migration requirement 205 by the organization.

In accordance with various embodiments of the present disclosure, the data analyzer 140 may assign a confidence value to each of the plurality of data domains 215 based on the data migration requirement 205 to determine an order of mapping the plurality of data domains 215 with the usage parameter index 225 and the storage parameter index 230, respectively. The confidence value may refer to a priority value that may be given to a domain from the plurality of data domains 215. A high priority value may indicate that the corresponding data domain may need to be migrated to the cloud platform ahead of other data domains from the plurality of data domains 215. A data domain from the plurality of data domains 215 with a high confidence value may be mapped first with the usage parameter index 225 and the storage parameter index 230. Additionally, a low priority value may indicate that the corresponding data domain may be migrated to the cloud platform at a later stage. The data analyzer 140 may assign the confidence value based on a response received from a user for the usage questionnaire and the storage questionnaire. For example, a user response may indicate which of the plurality of data domains 215 may be of a high priority for processing the data migration requirement 205.

The system 110 may further include the data migration predictor 150. The data migration predictor 150 may implement a first cognitive learning operation 255 to evaluate the data storage pattern 245 and the data usage pattern 235 to determine a data assessment index 260 comprising an assessment parameter set 295 associated with the data migration requirement 205. The first cognitive learning operation 255 may include implementation of various machine learning techniques (explained later by way of Subsequent FIGS.), text mining techniques (explained later by way of Subsequent FIGS.) and generation of various questionnaires (explained later by way of Subsequent FIGS.) for evaluating the data storage pattern 245 and the data usage pattern 235. The data assessment index 260 may determine strategic drivers required for processing the data migration requirement 205. The data assessment index 260 may include the assessment parameter set 295. The assessment parameter set 295 may be a set of measurable factors for determining the strategic drivers required for processing the data migration requirement 205. The assessment parameter set 295 may include parameters like ecosystem collaboration, flexibility of capability reduction, flexibility of scale, geographic expansion of business, resource mix, a volumetric analysis of data, data warehouse pattern, data supply chain, data storage & compute, data formats, data reports, historical data, data retention, data flexibility, data monetization and the like. In an example, the system 110 may generate the data usage pattern 235 and the data storage pattern 245 as an electronic document to a user. The system 110 may further receive a user input to the electronic document for determining the data assessment index 260. In an example, the assessment parameter set 295 may be derived from the usage parameter set 290 and the storage parameter set 285 based on input received from a user of the system 110.

The data migration predictor 150 may determine a data migration index 298 based on mapping a plurality of cloud platforms 265 to the data assessment index 260. The data migration index 298 may be comprising each of the plurality of cloud platforms 265 mapped to the data assessment index 260. In an example, the plurality of cloud platforms 265 may refer to the cloud platforms like AWS™, Azure™, GCP™, IBM™, and the like. The data migration predictor 150 may identify various measurable factors for measuring performance of a cloud platform for the data from the on-premise data warehouse 210. The measurable factors for measuring performance of a cloud platform may include geographic presence, cloud administration, cloud volumetric analysis, cloud storage & compute, back up services, cloud vendor, cloud vendor interoperability, cloud artificial intelligence, data warehouse pattern, data supply chain, and the like. The data migration predictor 150 may map each of the strategic drivers from the data assessment index 260 with the measurable factors for measuring performance of a cloud platform to determine the data migration index 298. The data migration index 298 may include various parameters from the data assessment index 260 mapped with each of the plurality of cloud platforms 265. The data migration predictor 150 may map the various parameters from the data assessment index 260 mapped with each of the plurality of cloud platforms 265 by implementing the first cognitive learning operation 255. The data migration index 298 may include various models for data migration, wherein each model may be specific to a cloud platform from the plurality of cloud platforms 265.

The modeler 160 may implement a second cognitive learning operation 270 to determine a data migration model 275 compatible with the data assessment index 260, based on the data migration index 298. The modeler 160 may analyze the data migration index 298 and determine a model for data migration, which may be compatible with the data usage pattern 235, and the data storage pattern 245 of an organization. The data migration model 275 may include recommendations for a data migration strategy, a cloud platform, a technical platform, a data warehouse type, and a data lake structure for processing the data migration requirement 205 (explained in detail by way of subsequent FIGS.). The data migration model 275 may be comprising a layout for transferring data stored in the on-premise data warehouse 210 to a cloud platform from the plurality of cloud platforms 265. In an example, the modeler 160 may generate the data migration index 298 as an interactive electronic document to receive a migration input from a user (explained in detail by way of subsequent FIGS.). The modeler 160 may implement the second cognitive learning operation 270 on the migration input to determine the data migration model 275 compatible with the data assessment index 260. Further, the modeler 160 may generate a data migration output 280 comprising the layout for transferring data stored in the on-premise data warehouse 210 to a compatible cloud platform from the plurality of cloud platforms 265 to resolve the data migration requirement 205.

The embodiments for the first cognitive learning operation 255 and the second cognitive learning operation 270 presented herein are exemplary in nature and should be treated as such. The data migration system 110 presented herein may facilitate the preparation of roadmap for movement to cloud. The data migration system 110 may facilitate prioritizing data that may be moved to the cloud platform. The data migration system 110 may facilitate estimation & planning for migration of data from the on-premise data warehouse 210 to the cloud platform. The data migration system 110 may augment a data discovery process by making data searching more effective. The data migration system 110 may facilitate in implementing data governance and quality process controls on the cloud platform. The data migration system 110 may facilitate a co-existence of the on-premise data and cloud data components. The data migration system 110 may prevent the implementation of a wrong data migration strategy, which may be leading to inflexibility and affecting data consumption. The data migration system 110 may prevent incorrect adoption of cloud patterns resulting in increased cycle time and cost inefficiency. The data migration system 110 may prevent inappropriate selection of data supply chain components leading to integration and performance issues. For the sake of brevity and technical clarity, the description of the data migration system 110 may be restricted to few exemplary embodiments, however, to a person skilled in the art it should be clear that the system may be used for the fulfillment of various data migration requirement 205s other than those mentioned hereinafter.

In operation, the system 110 may facilitate data migration from an on-premise data warehouse 210 of an organization to a compatible cloud platform. The system 110 may facilitate in designing a strategy for data migration by determining and analyzing various parameters like data usage pattern 235, data storage pattern 245, various cloud platforms, data priority, data formats, data types, data structure after migration to cloud platform, data accessibility after migration to cloud platform and the like. The system 110 may receive a data migration requirement 205. The system 110 may deploy the data assembler 130 to sort the data stored in the on-premise data warehouse 210 into a plurality of data domains 215 based on various attributes 220 associated with the data migration requirement 205. For example, attributes 220 may include identification of stakeholders, detailed schedule of workshops to be conducted for processing the data migration requirement 205, acceptance criteria of various activities to undertaken for processing the data migration requirement 205, an engagement plan for resolving the data migration requirement 205, and the like. The data analyzer 140 may map the plurality of data domains 215 with the usage parameter index 225 to determine the data usage pattern 235. The usage parameter index 225 may include the usage parameter set 290. The usage parameter set 290 may be a set of measurable parameters, which may be used to determine data usage for the data from an on-premise data warehouse 210 which would be migrated onto the compatible cloud platform. The data analyzer 140 may map the plurality of data domains 215 with the storage parameter index 230 to determine the data storage pattern 245. The storage parameter index 230 may include the storage parameter set 285. The storage parameter set 285 may be a set of measurable parameters, which may be used to determine data storage required for the data from an on-premise data warehouse 210 which would be migrated onto the compatible cloud platform. In an example, the data storage pattern 245 would include determining if the data from the on-premise data warehouse 210 would require a data lake, data warehouse, or a hybrid architecture after migration to the compatible cloud platform.

The data migration predictor 150 may implement the first cognitive learning operation 255 to evaluate the data usage pattern 235, the data storage pattern 245 and determine the data assessment index 260. The data assessment index 260 may include strategic drivers like ecosystem collaboration, flexibility of capability reduction, flexibility of scale, geographic expansion of business, resource mix, cloud bursting, ecosystem collaboration, regulatory compliance, system idle time, workload usage. The strategic drivers of the data assessment index 260 may be derived through evaluating the data usage pattern 235 and the data storage pattern 245 (explained in detail by way of subsequent FIGS.). The data migration predictor 150 may identify various measurable factors for measuring performance of a cloud platform for the data from the on-premise data warehouse 210. The measurable factors for measuring performance of a cloud platform may include geographic presence, cloud administration, cloud volumetric analysis, cloud storage & compute, back up services, cloud vendor, cloud vendor interoperability, cloud artificial intelligence, data warehouse pattern, data supply chain, and the like. The data migration predictor 150 may map each of the strategic drivers from the data assessment index 260 with the measurable factors for measuring performance of a cloud platform to determine the data migration index 298. The modeler 160 may implement the second cognitive learning operation 270 to determine the data migration model 275 from the data migration index 298. The data migration model 275 may refer to the map between each of the strategic drivers from the data assessment index 260 with the measurable factors for measuring performance of a cloud platform that may be compatible with the data from the on-premise data warehouse 210. The modeler 160 may implement the second cognitive learning operation 270 to determine the compatibility. The second cognitive learning operation 270 may include various machine learning techniques like for example, a K—nearest neighbor classifier, multivariate model (explained in detail by way of subsequent FIGS.). The data migration model 275 may include a layout for migration of the data from the on-premise data warehouse 210 onto the compatible cloud platform.

The system 110 presented herein may offer many advantages with respect to the migration of data from the on-premise data warehouse 210 to the cloud platform. The system 110 may expedite the planning of journey of data migration to a cloud platform. The system 110 may provide a holistic and streamlined approach to assess, inspect and recommend a strategy for data migration. The system 110 may provide a machine learning fueled comparison resulting in time and effort savings during the process of data migration. The system 110 may facilitate visualizing the target state architecture for data migration along with the right data supply chain components. The system 110 may provide a comprehensive repository of questions covering aspects from strategy to data supply chain building for data migration. The system 110 may act as a quick validator for a target architecture design for data migration. The system 110 may provide easy customization for contextualizing the data migration requirement 205 with respect to an organization. The system 110 may provide a flexible solution for evaluation of data for the purpose of data migration. The system 110 may receive inputs from a user to act as a quick reference while evaluating data for the purpose of data migration while being easy to operate.

Figure 3:
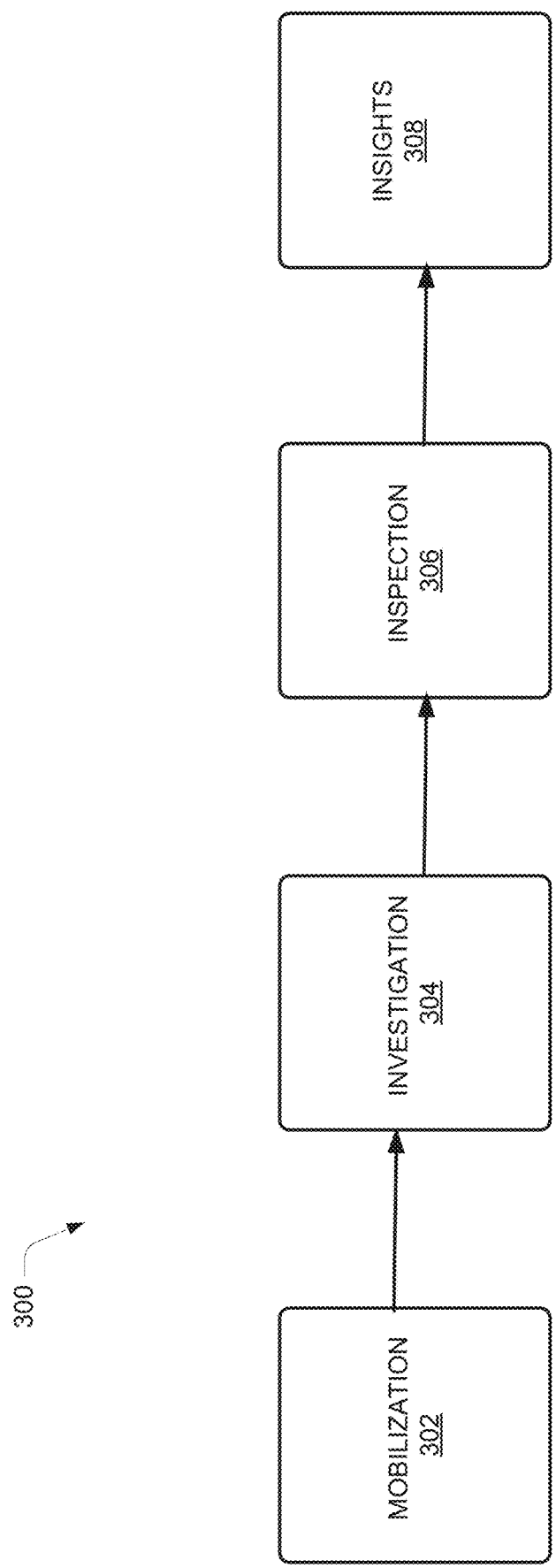
FIG. 3 illustrates a flow diagram of a data migration system, according to an example embodiment of the present disclosure.

FIG. 3 illustrates a comprehensive workflow diagram of a data migration system 300 (referred to as system 300 hereinafter), according to an example embodiment of the present disclosure. The system 300 may deploy any of the components of the system 110 as mentioned above by way of FIG. 1 and FIG. 2. For the sake of brevity and technical clarity, the components described above by way of FIG. 1 and FIG. 2 would be not be explained for FIG. 3. The system 300 may be used for migration of data from an on-premise data warehouse 210 of an organization to a compatible cloud platform. In accordance with various embodiments of the present disclosure, the system 300 may be the same as the system 110 and for the sake of brevity and technical clarity, the system 300 may be referred to as the system 110. The system 300 may receive the data migration requirement 205. The system 300 may process the data migration requirement 205 in four phases. The four phases may include a mobilization phase 302, an investigation phase 304, an inspection phase 306, and an insight generation phase 308.

The mobilization phase 302 may include the generation of a roadmap for conducting an assessment for establishing an efficient operating model for successful execution of the investigation phase 304, the inspection phase 306, and the insight generation phase 308 and resolution of the data migration requirement 205. the mobilization phase 302 may produce an engagement plan, an establishment of various templates to be used in subsequent phases, identification of stakeholders, and detailed schedule of meetings to be conducted for execution of the investigation phase 304, the inspection phase 306, and the insight generation phase 308. The mobilization phase 302 may include implementing various tasks including creating various templates for executing the investigation phase 304, the inspection phase 306, and the insight generation phase 308. A few examples of the templates create during the mobilization phase 302 may be illustrated by the way of FIG. 7. The mobilization phase 302 may lead to the investigation phase 304.

The investigation phase 304 may include discovering and analyzing the on-premise data landscape of an organization through various questionnaires and technical scripts to generate various reports providing information about existing data and infrastructure complexity, utilization, and the like. The analysis at the investigation phase 304 may span across on-premise landscape assessment, data usage, and workload assessment, and workload assessment and optimization (explained in further detail by way of subsequent FIGS.) to provide a 360 & in-depth view of the data management systems. The on-premise landscape assessment may include a complete study of organization's data landscape using the usage questionnaire and the storage questionnaire. The investigation phase 304 may deploy various optical character recognition (OCR) & natural language processing (NLP) techniques to extract relevant information providing insights about existing on-premise landscape. The investigation phase 304 may provide a detailed overview of a complete on-premise technical inventory, prioritization of critical points & use cases that may need to act as a guide for the data migration to the cloud. This information may be standardized into a feature set, such as a profile of the on-premise data landscape. This profile may then be used as a feature to predict the best suited technical components of the target architecture on cloud. In an example, the profile may be the data assessment index 260.

The inspection phase 306 may include analyzing the profile generated from the investigation phase 304 and comparing the same with the plurality of cloud platforms 265 and provide recommendations for a data migration strategy, a cloud platform, a technical platform, a data warehouse type, and a data lake structure for resolving the data migration requirement 205 (explained in detail by way of subsequent FIGS.). The inspection phase 306 may deploy questionnaire-based techniques, text mining and machine learning-based techniques for providing recommendations (explained later by way of subsequent FIGS.). In an example, the inspection phase 306 may generate the data migration model 275 for resolving the data migration requirement 205.

The insight generation phase 308 may determine the exact architecture consisting of the compatible cloud components/services for resolving the data migration requirement 205. The insight generation phase 308 may provide a complete graphical representation of the cloud-based tools for the entire data associated with the data migration requirement 205 (explained in detail by way of FIG. 15).

Figure 4:
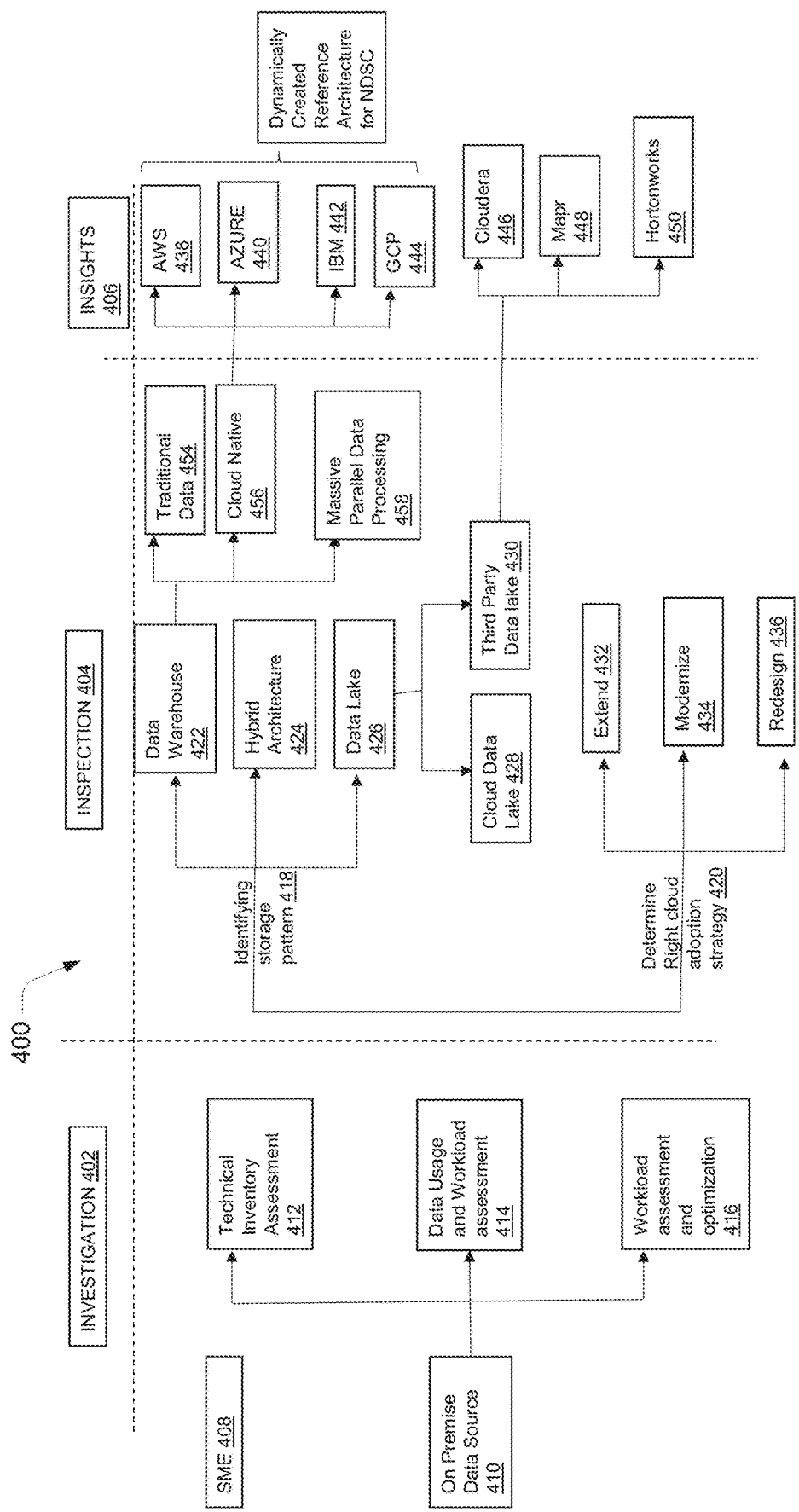
FIG. 4 illustrates a network functional diagram of a data migration system, according to an example embodiment of the present disclosure.

FIG. 4 illustrates a network functional diagram of a data migration system 400, (referred to as system 400 hereinafter), according to an example embodiment of the present disclosure. The system 400 may deploy any of the components of the system 110 as mentioned above by way of FIG. 1, FIG. 2, and FIG. 3. For the sake of brevity and technical clarity, the components described above by way of FIGS. 1-3 would be not be explained for FIG. 4. The system 400 may be used for migration of data from an on-premise data warehouse 210 of an organization to a compatible cloud platform. In accordance with various embodiments of the present disclosure, the system 400 may be the same as the system 110 and for the sake of brevity and technical clarity, the system 400 may be referred to as the system 110. The system 400 may be implemented by an organization 408. The system 400 may include an investigation phase 402, an inspection phase 404, and an insight generation phase 406. The investigation phase 402 may be same as the investigation phase 304, the inspection phase 404 may be same as the inspection phase 306. The insight generation phase 406 may be same as the insight generation phase 308.

The investigation phase 402 may include an investigation of an on-premise data source 410. The on-premise data source 410 may be the data stored on the on-premise data warehouse 210 for migration onto the compatible cloud platform (as mentioned above). The investigation of an on-premise data source 410 may include a technical inventory assessment 412, a data usage and workload assessment 414, and a workload assessment and optimization 416. The technical inventory assessment 412 may include a complete study of an organization's data landscape using a questionnaire-based technique. In an example, the system 400 may deploy the usage questionnaire the storage questionnaire for the technical inventory assessment 412. The data usage and workload assessment 414 may include an evaluation for assessing the type of data like hot, warm cold for identifying complex queries for migration, assessing database objects usage, data and infra utilization, and the like. The workload assessment and optimization 416 may evaluate existing data warehouse, complexity of dimension tables, fact tables and like for an organization implementing the system 110. The investigation of the on-premise data source 410 may be a questionnaire-based assessment conducted through workshops and one-one meeting and provides an option to capture information across various measurable parameters such as an organization data warehouse, technical architecture of the organizational database, data intelligence associated with the organizational database, operating system or a middleware associated with the organizational database associated with the organizational database, technical details associated with the organizational database, data compliance, self-healing capabilities associated with the organizational database, data infrastructure associated with the organizational database, application server associated with the organizational database, data archival & latency associated with the organizational database, complexity of various data extraction processes associated with the organizational database, and the like. In an example, the system 400 may generate the usage questionnaire and the storage questionnaire based on any of the measurable parameters mentioned above. The system 400 may receive a user response on the questionnaire generated for the parameters mentioned above and store the same to be used for future reference as well as for execution of the inspection phase 404 and the insight generation phase 406. The system 400 may generate the questionnaire as an interactive electronic document for receiving a user response on the same. The questionnaire for the investigation of the on-premise data source 410 may be hosted in the system 400 and may be accessed through a web user interface built using an Angular JS & a Node JS (explained in detail by way of FIG. 5). The information captured for the questions may be stored in the SQLITE3 database (explained in detail by way of FIG. 5) and may be downloaded in form of reports by a user of the system 110.

In accordance with various embodiments of the present disclosure, the data usage and workload assessment 414 and the workload assessment and optimization 416 may be determined through the following steps. The system 400 may extract relevant questions from the questionnaire. The questions may be provided to the user of the system 400. The user may execute the questions and may generate a SQL Workload file. The SQL workload file may be uploaded into the system 400. The system 400 may process the SQL workload file and generate a dashboard. The user of the organization 408 may access the dashboard through a web browser. The technical inventory assessment 412 may provide reports for a user to download from the system 400. The data usage and workload assessment 414 and the workload assessment and optimization 416 may produce a dashboard comprising the data usage pattern 235 and the data storage pattern 245. The dashboard may include access to a data & infrastructure utilization reports, unused data reports, data audit, and compliance reports, data type reports, performance users & reports, track performance metrics, and the like (explained in further detail by way of FIG. 8 and FIG. 9).

The investigation 402 of the on-premise data source 410 may be followed by the inspection 404. The inspection 404 may include a strategy assessment 420, and a technical platform assessment 418. The technical platform assessment 418 may further include an assessment of a data warehouse 422, and a data lake 426. The assessment of the data warehouse 422 may further include a cloud platform assessment 456. Each assessment from the inspection 404 may be implemented through a questionnaire-based approach, a text mining approach, and machine learning-based approaches for generating recommendations. The three approaches are detailed herein for each of the assessments.

In accordance with various embodiments of the present disclosure, the strategy assessment 420 may deploy the questionnaire-based approach to capture various strategic drivers through various measurable parameters like ecosystem collaboration, flexibility of capability reduction, flexibility of scale, geographic expansion of business, and resource mix. The questionnaire-based approach may also analyze various cloud platform drivers, for example, cloud bursting, ecosystem collaboration, regulatory compliance, system idle time, workload usage, and the like. The system 400 may capture aforementioned parameters and process the data through a text mining algorithm to create a strategy profile for the data migration requirement 205. The text-mining algorithm may involve automatic extraction of the responses from the questionnaire and conversion into standard values of depicting high priority, medium priority & low priority data. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". As mentioned above, the system 110 may assign confidence scores to the plurality of data domains 215 for mapping with the usage parameter index 225 and the storage parameter index 230. The strategy profile may be subjected to a machine learning algorithm such as a classifier model for generating recommendations. An exemplary strategy profile may be presented herein replete with the standard values of depicting the high priority, the medium priority, and the low priority for the strategic drivers for the strategy assessment 420.

| Ecosystem collaboration | 2 |
|---|---|
| Flexibility of capability reduction | 3 |
| Flexibility of scale | 3 |
| Geographic expansion of business | 1 |
| Resource mix | 1 |
| Cloud bursting, | 1 |
| Ecosystem collaboration, | 3 |
| Regulatory compliance, | 1 |
| System idle time, | 2 |
| Workload usage | 3 |

In an example, the strategy assessment 420 may generate a recommendation for an extension 432. The extension 432 may include extending the architecture of target cloud platform. In an example, the strategy assessment 420 may generate a recommendation for a modernization 434. The modernization 434 may include modernizing the architecture of target cloud platform. In an example, the strategy assessment 420 may generate a recommendation for a redesign 436. The redesign 436 may include redesigning the architecture of target cloud platform.

In accordance with various embodiments of the present disclosure, the technical platform assessment 418 may deploy the questionnaire-based approach to capture information across various measurable parameters such as data formats, reports, historical data, data retention, data flexibility, data monetization, and the like. The system 400 may capture aforementioned parameters and process the data through a text mining algorithm to create a technical pattern profile for the data migration requirement 205. The information generated through the technical platform assessment 418 questionnaire may be processed through the text mining algorithm and then subjected to a machine learning algorithm such as a classifier model for generating recommendations. The text-mining algorithm may involve automatic extraction of the responses from the questionnaire and conversion into standard values of depicting high priority, medium priority & low priority data. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". In an example, the recommendations may be a choice amongst the data warehouse 422, the data lake 426, a hybrid 426. An exemplary technical pattern profile may be presented herein replete with the standard values of depicting the high priority, the medium priority & the low priority for the strategic drivers for the technical platform assessment 418.

| Data formats, | 2 |
|---|---|
| Reports, | 1 |
| Historical data, | 1 |
| Data retention, | 3 |
| Data flexibility | 1 |
| Data monetization | 2 |

In accordance with various embodiments of the present disclosure, the technical platform assessment 418 may recommend the data warehouse 422 as a technical pattern for processing the data migration requirement 205. The system 400 may conduct the assessment for the data warehouse 422 in such a scenario to establish a data warehouse requirement profile. The assessment for the data warehouse 422 may deploy the questionnaire-based approach to capture information across various measurable parameters such as availability, concurrency, data cloning, data ingestion, database management, elastic data warehouse, geospatial analysis, queries and reports, data storage, data support and the like. The information generated through the assessment for the data warehouse 422 questionnaire may be processed through a text mining algorithm and then to subjected to a machine learning algorithm such as a classifier model for generating recommendations. The text-mining algorithm may involve automatic extraction of the responses from the questionnaire and conversion into standard values of depicting high priority, medium priority & low priority data. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". The recommendations for the assessment for the data warehouse 422 may include a traditional data warehouse 454, a native cloud data warehouse 456, and a parallel processing data warehouse 458. An exemplary data warehouse requirement profile may be presented herein replete with the standard values of depicting the high priority, the medium priority & the low priority for the strategic drivers for the assessment for the data warehouse 422.

| | |
|---|---|
| Availability | 3 |
| Concurrency | 2 |
| Data cloning | 2 |
| Data ingestion | 1 |
| Database management | 1 |
| Elastic data warehouse | 1 |
| Geospatial analysis | 1 |
| Queries and reports | 1 |
| Data storage | 3 |
| Data support | 2 |

In accordance with various embodiments of the present disclosure, the assessment for the data warehouse 422 may recommend the deployment of the native cloud 456. In such an example, the system 400 may undertake an assessment for the cloud platform 456 by deployment of the questionnaire-based approach to capture information across various measurable parameters such as a cloud geographic presence, cloud administration, cloud volumetric analysis, cloud storage & computation, cloud back up services, cloud vendor, cloud vendor interoperability, cloud artificial intelligence, data warehouse pattern, data supply chain, and the like. The information generated through the cloud platform assessment questionnaire may be processed through a text mining algorithm to create a cloud platform requirement profile. The text-mining algorithm may involve automatic extraction of the responses from the questionnaire and conversion into standard values of depicting high priority, medium priority & low priority data. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". The cloud platform requirement profile may be subjected to a machine learning algorithm such as a classifier model for generating recommendations. The cloud platform assessment 456 may generate recommendations in form of a cloud platform to be used for migration of the on-premise data source 410. The cloud platform recommendations may be using an Amazon Web Service™ (AWS) platform 438, an AZURE™ platform 440, an IBM™ platform 442, a Google® Cloud (GCP™) platform 444. The AWS platform 438, the AZURE™ platform 440, the IBM™ platform 442, the Google® Cloud (GCP™) platform 444 may dynamically create a reference architecture. An exemplary cloud profile may be presented herein replete with the standard values of depicting the high priority, the medium priority & the low priority for the strategic drivers for the cloud platform assessment 456.

| | |
|---|---|
| Cloud geographic presence | 3 |
| Cloud administration, | 1 |
| Cloud volumetric analysis, | 1 |
| Cloud storage & computation, | 2 |
| Cloud back up services, | 1 |
| Cloud vendor, | 3 |
| Cloud vendor interoperability, | 3 |
| Cloud artificial intelligence, | 1 |
| Data warehouse pattern, | 3 |
| Data supply chain | 1 |

In accordance with various embodiments of the present disclosure, the technical platform assessment 418 may recommend the data lake 426 or hybrid pattern 424 as a technical pattern for processing the data migration requirement 205. The system 400 may conduct the assessment for the data lake 426 in such a scenario to establish a data lake requirement profile. The assessment for the data lake 426 may deploy the questionnaire-based approach to capture information across various measurable parameters such as data analysis, availability, lineage, operations, storage, replication, security, and the like. The information generated through the questionnaire may be processed through a text mining algorithm to create a data lake requirement profile. The text-mining algorithm may involve automatic extraction of the responses from the questionnaire and conversion into standard values of depicting high priority, medium priority & low priority data. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". The data lake requirement profile may be then subjected to a classifier model, which may be a supervised machine learning technique to recommend whether the data lake 426 should be a cloud data lake 428, or a third-party data lake 430. In an example, the classifier model may also recommend which platform may be compatible with the on-premise data source 410 from the third-party data lake 430 such as a Cloudera™ application 446, a Mapr™ application 448, and a Hortonworks™ Application 450. The recommendations generated by the technical platform assessment 418 may fall under the insight generation 406. An exemplary data lake requirement profile may be presented herein replete with the standard values of depicting the high priority, the medium priority & the low priority for the strategic drivers for the assessment for the data lake 426.

| | |
|---|---|
| Data analysis | 1 |
| Availability | 3 |
| Lineage | 1 |
| Operations | 2 |
| Storage | 3 |
| Replication | 3 |
| Security | 3 |

As mentioned above, each of the assessments may deploy the text mining technique for automatic extraction of the responses from the questionnaire and conversion into standard values of depicting high priority, medium priority & low priority data. The details of text mining technique may be presented herein. The objective of the text mining component may be to ingest the responses mentioned in the questionnaire and create various requirement profiles (as mentioned above) so that they may be served as an input to the various machine learning-based prediction models such as the classifier model. The algorithm predicts the probability of priority based on the text contained in the response by the user, thereby increasing efficiency and effectiveness of the process. The text mining algorithm may use word libraries such as "pandas", "re", "openpyxl", and the like. The text-mining algorithm may assign labels to sample responses from a user for various questionnaires. In accordance with various embodiments of the present disclosure, the standard values of depicting high priority may be labeled by the system 110 as "1". The standard values of depicting medium priority may be labeled by the system 110 as "2". The standard values of depicting low priority may be labeled by the system 110 as "3". The labels mentioned herein, may be a probability of priority based on the text contained in the response by the user. The algorithm may remove any stop words from the responses and a cleansed response text may be then split into constituent words. For example, the text in the responses from the user may be cleaned to remove stop words using a library NLTK corpus (Natural Language Toolkit) in python which may have a list of stop words predefined as well as the custom stop words that may be defined by a user. The cleansed response text may then be split into constituent words. A term document matrix may be created to determine the frequency of the distinct words in each response from a user. In an example, the term document matrix may be created using CountVectorizer method of sklearn.feature_extraction.text to determine the frequency of the distinct words in each response from a user. A naïve Bayes algorithm may be trained on the term-document matrix to determine the probability of association of each response to the priorities such as "1", "2", and "3" based on the words contained in the responses. The algorithm may then ingest the responses for each parameter from the questionnaire and produces a profile (sample). The system 400 may generate various recommendations for processing the data migration requirement 205 using the questionnaire-based approach, the text mining algorithm and the machine learning algorithm. For example, for the assessment for the data lake 426 the questionnaire may have questions to determine requirement for data analysis, availability, lineage, operations, storage, replication, security, and the like. The responses mentioned against each question may be processed and produce a data lake requirement profile as mentioned above.

Figure 5:
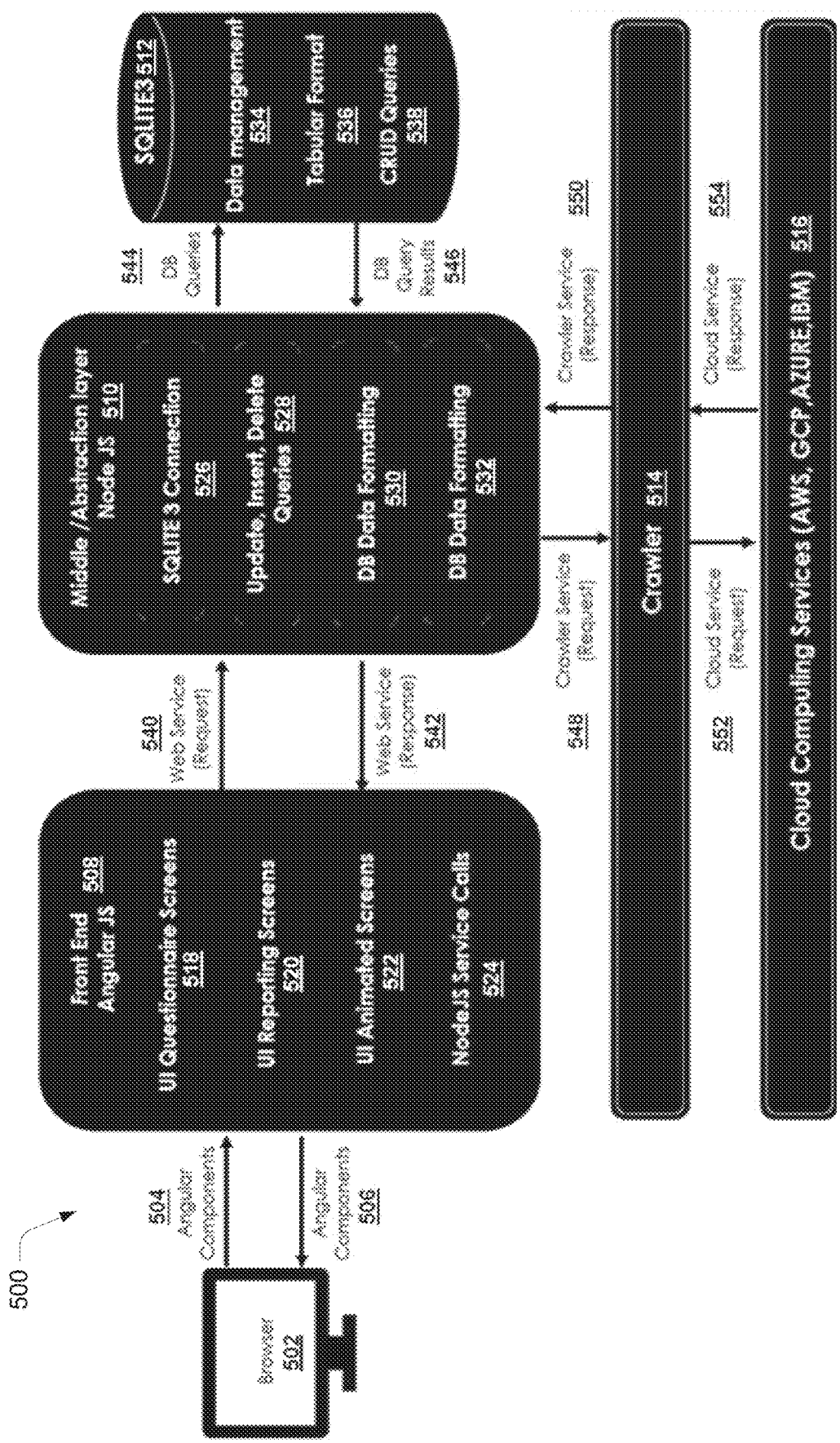
FIG. 5 illustrates a network architecture diagram of a data migration system, according to an example embodiment of the present disclosure.

FIG. 5 illustrates a network architecture diagram 500 of the data migration system 110, according to an example embodiment of the present disclosure. The network architecture diagram 500 may deploy any of the components of the system 110 as mentioned above by way of FIG. 1, FIG. 2, FIG. 3 and FIG. 4. For the sake of brevity and technical clarity, the components described above by way of FIGS. 1-4 would be not be explained for FIG. 5. The network architecture diagram 500 may include a browser 502. The browser 502 may be an interface between a user of the system 110 with the system 110. The network architecture diagram 500 may further include a front-end angular JS 508, a middle layer node JS 510, an SQLite database 512, a crawler 514, and a cloud computing service 516.

The front-end angular JS 508 may interact with the browser 502 through a forward angular component 504 and a backward angular component 506. The front-end angular JS 508 may interact with the middle layer node JS 510 through a web-service request 540. The front-end angular JS 508 may include a questionnaire screen 518, a reporting screen 520, an animated screen 522, a node JS service call screen 524. The middle layer node JS 510 may interact with the front-end angular JS 508 with a web-service response 542. The middle layer node JS 510 may interact with the SQLite database 512 through a database query component 544 and a database query result component 546. The middle layer node JS 510 may interact with the crawler 514 through a crawler service 518 and a crawler service response 550. The middle layer node JS 510 may include an SQLITE 3 connection 526, a query update component 528, a database formatting component 530, and a second database formatting component 532. The SQLite database 512 may include a data management component 534, a tabular formatting component 536, and a queries component 538. The crawler 514 may interact with the cloud computing service 516 through a cloud service request 552 and a cloud service response 554. All the components of the network architecture diagram 500 may interact with each other for processing the data migration requirement 205 and interacting with the user of the system 110.

Figure 6:
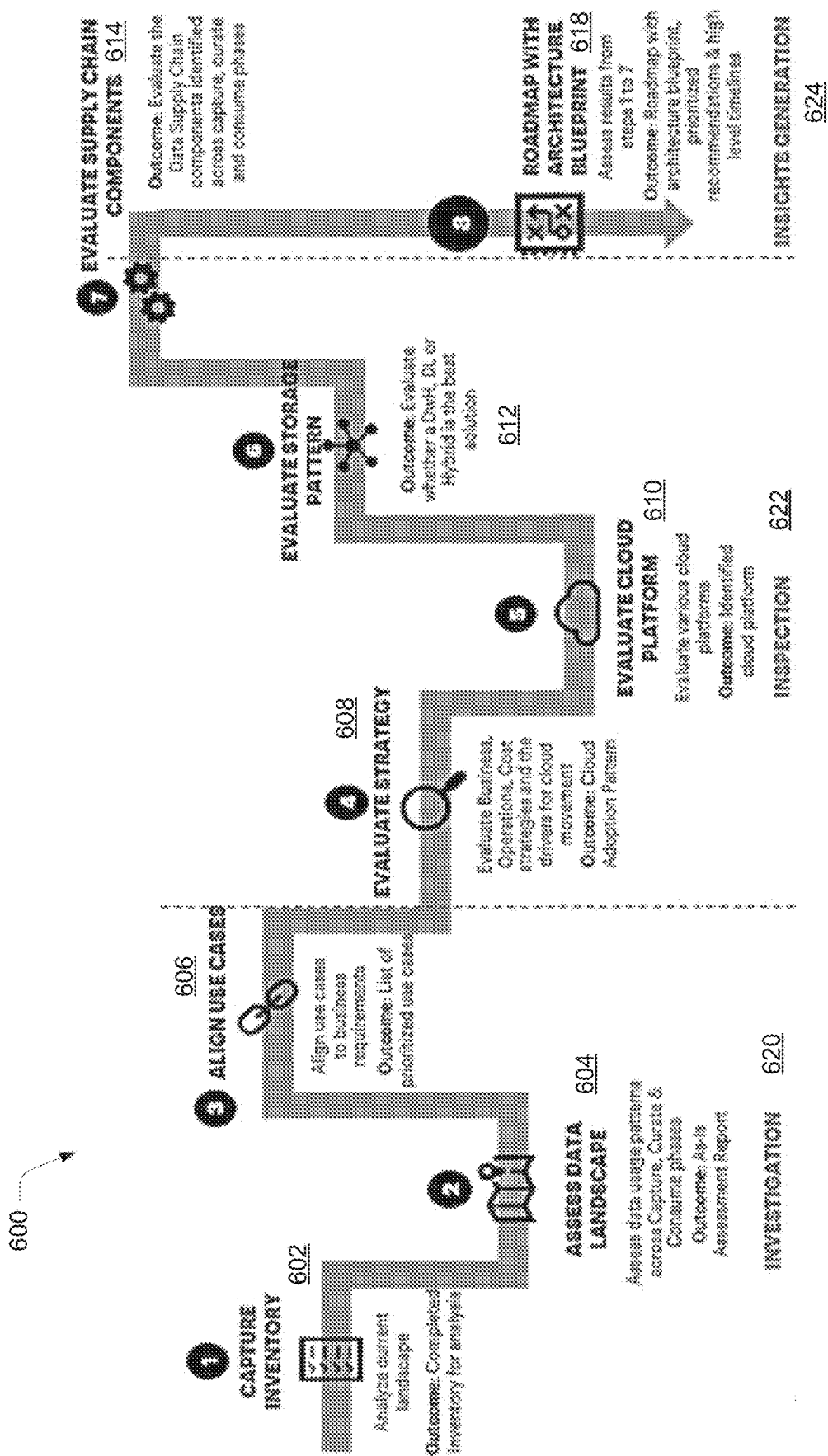
FIG. 6 illustrates a pictorial representation of various functional aspects of a data migration system, according to an example embodiment of the present disclosure.

FIG. 6 illustrates a pictorial representation 600 of various functional aspects of a data migration system 110, according to an example embodiment of the present disclosure. Any of the components described by the way of FIGS. 1-5 may be deployed for describing the pictorial representation 600. The pictorial representation 600 may illustrate the processing of the data migration requirement 205 using the system 110. The system 110 may process the data migration requirement 205 by implementing an investigation 620, an inspection 622, and an insights generation 624. The investigation 620 may be same as the investigation phase 304 and the investigation phase 402, the inspection 622 may be same as the inspection phase 306 and the inspection phase 404. The insight generation 624 may be same as the insight generation phase 308, and the insight generation phase 406. The investigation 620 may include an analysis 602, an assessment 604, and an alignment 606. The analysis 602 may include analyzing a complete data landscape of an organization (as also explained by way of FIG. 4 for the investigation phase 402). The assessment 604 may include determination of the data usage pattern 235 and the data storage pattern 245 (as also explained by way of FIG. 4 for the investigation phase 402). The alignment 606 may include determining a list of prioritized cases for migrating from an on-premise data warehouse 210 to a compatible cloud platform. The inspection 622 may include a strategy evaluation 608, a cloud platform evaluation 610, and a storage pattern evaluation 612. The strategy evaluation 608 may be similar to the strategy assessment 420 as explained by way of FIG. 4. The cloud platform evaluation 610 may be similar to the assessment for the cloud platform 456 as explained by way of FIG. 4. The storage pattern evaluation 612 may be similar to the technical platform assessment 418 as explained by way of FIG. 4. The insight generation 624 may include a supply chain evaluation 614, and a roadmap 618. The supply chain evaluation 614 may include evaluating the data supply chain components identified across various stages through questionnaires, text mining, and machine learning techniques. The roadmap 618 may be constructed after evaluating the results from the investigation 620 and the inspection 622 for generating various recommendations, as also explained by way of FIG. 4.

Figure 7:
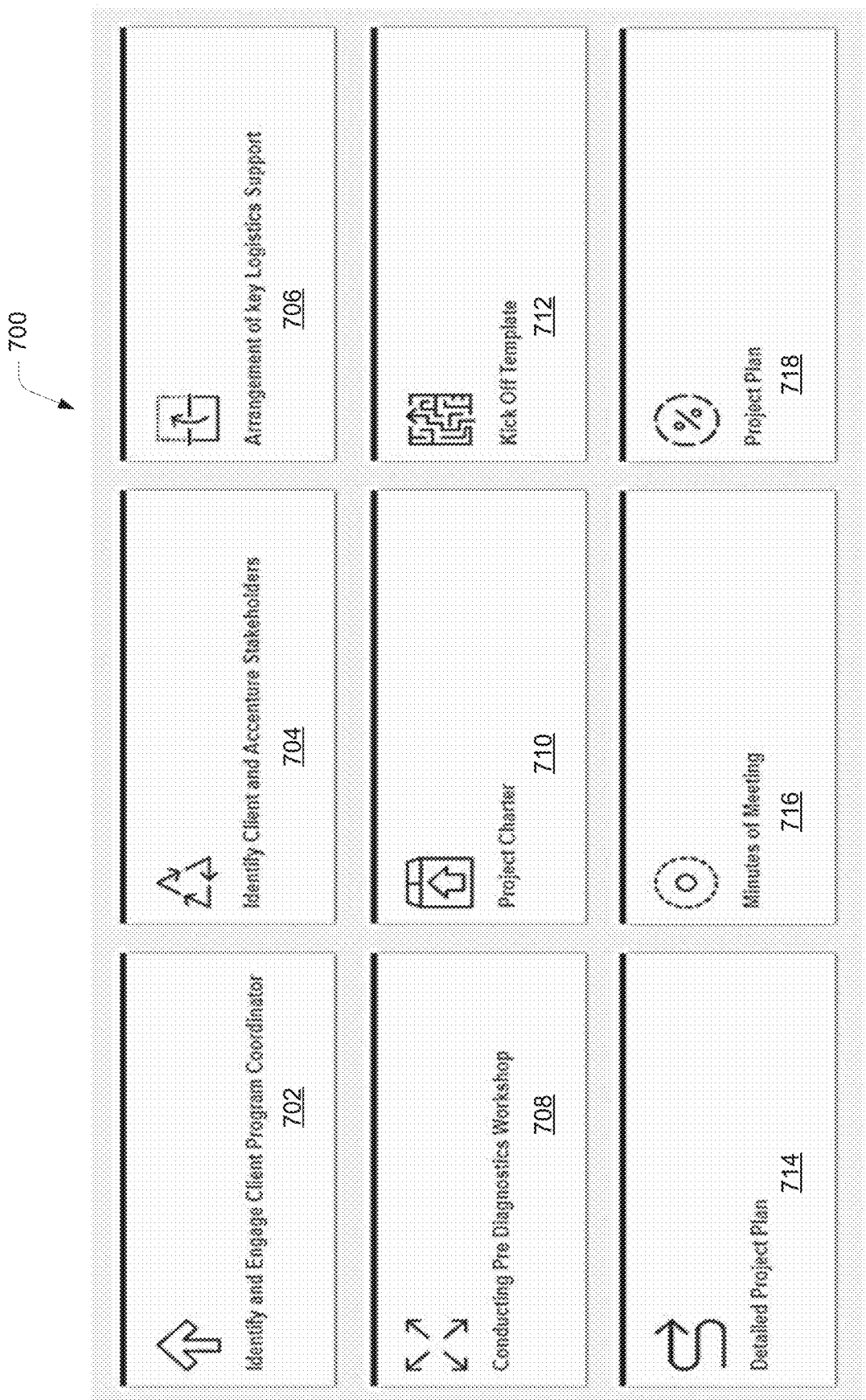
FIG. 7 illustrates a pictorial representation for working of a mobilization aspect of a data migration system, according to an example embodiment of the present disclosure.

FIG. 7 illustrates a pictorial representation 700 for working of a mobilization aspect of a data migration system, for data migration according to an example embodiment of the present disclosure. Any of the components described by the way of FIGS. 1-6 may be deployed for describing the pictorial representation 700. The pictorial representation 700 may represent the templates generated by the system 110 from the mobilization phase 302 as mentioned by way of FIG. 3. In accordance with various embodiments of the present disclosure, the templates may include an identification of a coordinator 702, an identification of stakeholders 704, an arrangement of logistics support for data 706, an schedule for conducting workshops 708, a data migration project charter 710, a data migration project initiator template 712, a detailed data migration project plan 714, summary for various meetings 716, and various data migration project plans 718. Each of these templates may be accessed by a user of the system 110 for processing the data migration requirement 205.

Figure 8:
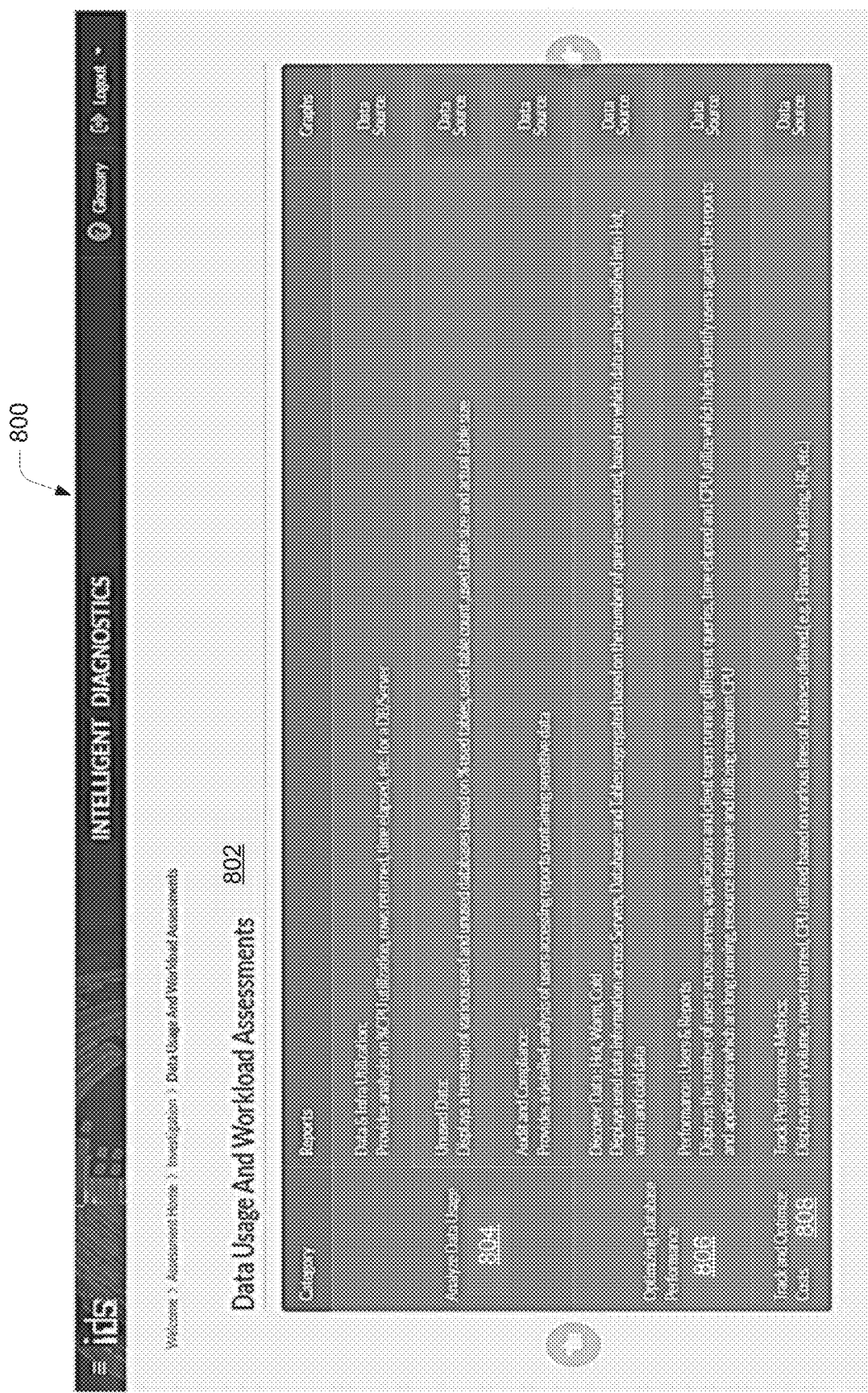
FIG. 8 illustrates a pictorial representation of a data usage assessment deployed by a data migration system, according to an example embodiment of the present disclosure.

FIG. 8 illustrates a pictorial representation of a data usage assessment 800 deployed by the data migration system 110, for data migration according to an example embodiment of the present disclosure. Any of the components described by the way of FIGS. 1-7 may be deployed for describing the data usage assessment 800. The data usage assessment 800 may be similar to the data usage and workload assessment 414. The data usage assessment 800 may produce a dashboard comprising the data usage pattern 235 and the data storage pattern 245. The data usage assessment 800 may include an analyze data usage component 804, an optimizing database performance component 806, and a track and optimize cost component 808. The analyze data usage component 804 may include access to data & infrastructure utilization reports, unused data reports, data audits, and compliance reports. The optimizing database performance component 806 may include data type reports, performance users & reports. The track and optimize cost component 808 may include track performance metrics. The data & infrastructure utilization reports may include providing analysis of a percentage of storage utilization, rows returned, time elapsed, and the like. The unused data reports may include displays like a treemap of various used and unused databases based on a percentage of used tables, used table count, used table size and actual table size, and the like. The audit and compliance reports may provide a detailed analysis of users accessing reports containing sensitive data. The optimization of database performance may be done by segregating data based on the number of queries executed, based on which data may be classified into Hot, Warm, and Cold (as detailed by way of FIG. 9). The performance of user reports may display the number of users across servers, application and client users running different queries, time elapsed and storage utilization which may help identify users against the reports and applications which may be long-running, resource-intensive and utilizing maximum storage space. The track performance metrics may include displays like query volume, rows returned, storage utilized based on various defined lines of work of an organization.

Figure 9:
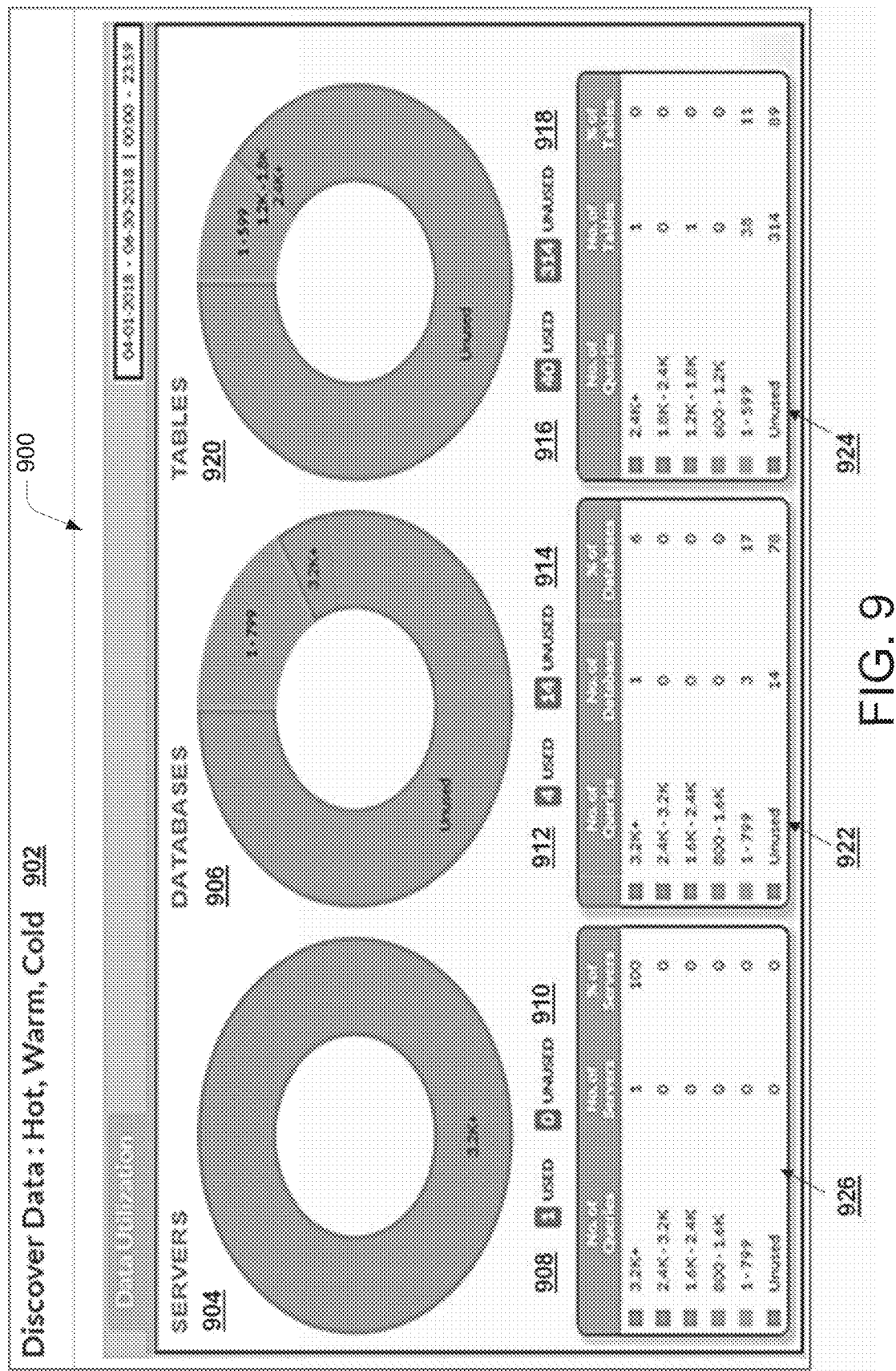
FIG. 9 illustrates a pictorial representation of a data storage pattern generated by deploying a data migration system, according to an example embodiment of the present disclosure.

FIG. 9 illustrates a pictorial representation of a data storage pattern 900 generated by deploying the data migration system 110, according to an example embodiment of the present disclosure. Any of the components described by the way of FIGS. 1-8 may be deployed for describing the data storage pattern 900. As mentioned above by way of FIG. 8 the data usage assessment 800 may provide details about used and unused data storage space across various servers, databases, and tables. The data storage pattern 900 may illustrate the optimization of data performance by a segregation 902. The optimization 902 of data performance may be done by segregating data based on the number of queries executed, based on which data may be classified into Hot, Warm, and Cold. The data storage pattern 900 may include a server space component 904, a database space component 906, and tables component 920. The server space component 904 may include a used space component 908 and an unused space component 910. The server space component 904 may include a queries table 926 listing number of data queries across the server space. The database space component 906 may include a used space component 912 and an unused space component 914. The database space component 906 may include a queries table 922 listing number of data queries across the databases of an organization. The tables component 920 may include a used space component 916 and an unused space component 918. The tables component 920 may include a queries table 924 listing number of data queries across various tabular columns.

Figure 10:
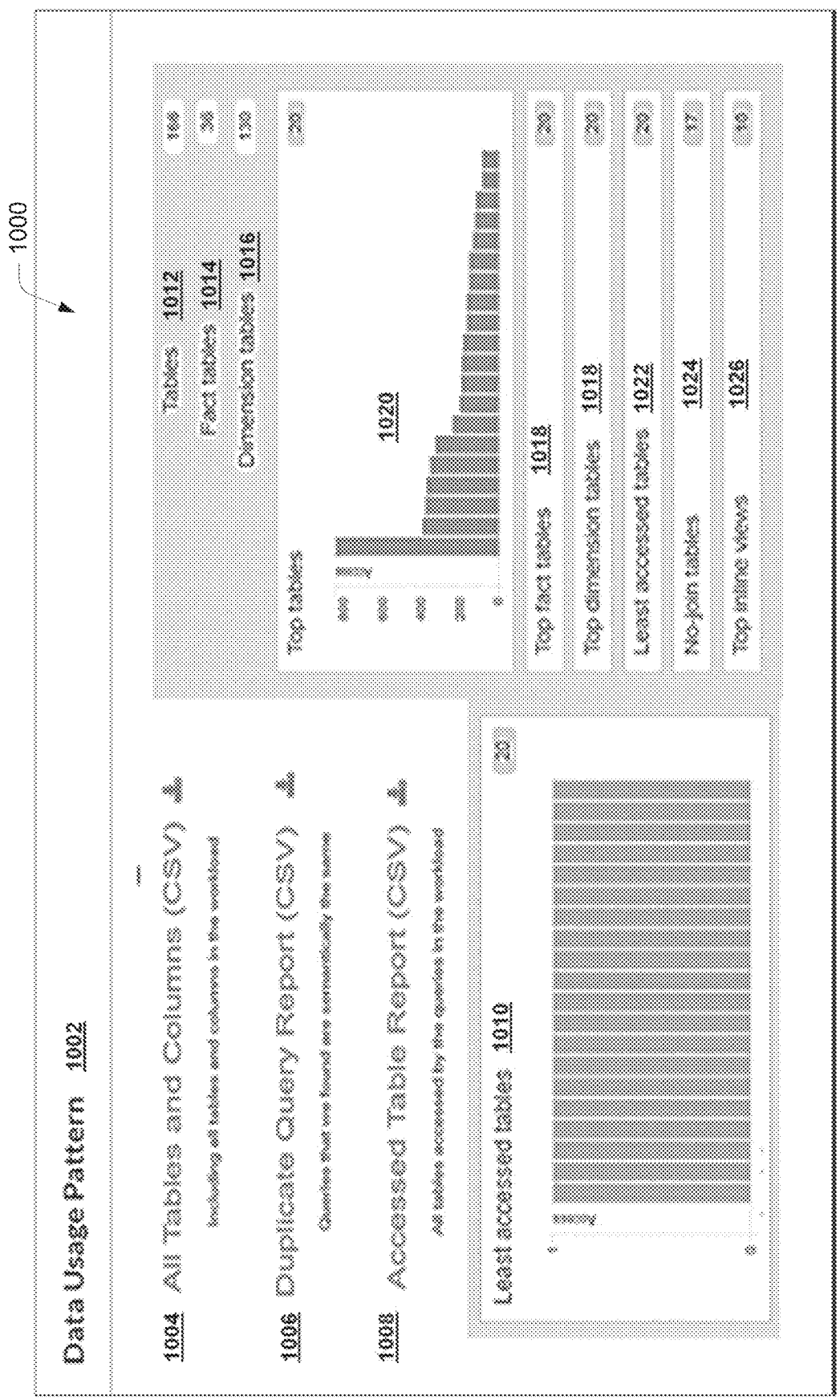
FIG. 10 illustrates a pictorial representation of a data usage pattern generated by deploying a data migration system, according to an example embodiment of the present disclosure.

FIG. 10 illustrates a pictorial representation 1000 of a data usage pattern 1002 generated by deploying the data migration system 110, according to an example embodiment of the present disclosure. Any of the components described by the way of FIGS. 1-9 may be deployed for describing the data usage pattern 1002. The data usage pattern 1002 may include a report 1004 for all tables and columns made for the data associated with the data migration requirement 205. The data usage pattern 1002 may include a report 1006 for all duplicate data entries in the data associated with the data migration requirement 205. The data usage pattern 235 100 may include a report 1008 for all tables and columns assessed by various queries made for the data associated with the data migration requirement 205. The data usage pattern 1002 may include a report 1010 for all least accessed tables and columns made for the data associated with the data migration requirement 205. The data usage pattern 1002 may include a tab 1012 for all tables, a tab 1014 for all fact tables, a tab 1016 for all dimension tables, a tab 1018 for all fact tables, a tab 1018 for all top dimension tables, a tab 1020 for all top tables, a tab 1022 for all least accessed tables, a tab 1024 for all non-joint tables, a tab 1026 for all top viewed tables made for the data associated with the data migration requirement 205. In an example, the data usage pattern 1002 may include may other types of tab depicting the data usage pattern 1002 for data associated with the data migration requirement 205.

FIG. 11 illustrates a pictorial representation 1100 of an evaluation 1102 of a cloud platform generated by deploying the data migration system 110, according to an example embodiment of the present disclosure. Any of the components described by the way of FIGS. 1-10 may be deployed for describing the pictorial representation 1100. As also mentioned by way of FIG. 4 the system 110 may perform the assessment for the cloud platform 456 by deployment of the questionnaire-based approach to capture information across various measurable parameters such as a cloud geographic presence, cloud administration, cloud volumetric analysis, cloud storage & computation, cloud back up services, cloud vendor, cloud vendor interoperability, cloud artificial intelligence, data warehouse pattern, data supply chain, and the like (as also visible in the pictorial representation 1100). In the pictorial representation 1100, the evaluation 1102 may be similar to the assessment for the cloud platform 456. The evaluation 1102 may include a question 1104 and a question 1106. The question 1104 may be related to the cost of a cloud platform. The user of the system 110 may be required to answer the question 1104. The system 110 may generate the question 1104 and a series of possible responses for the question 1104 based on the text mining algorithm and the machine learning algorithm also described by way of FIG. 4. The question 1106 may be related to the cloud back up services. The system 110 may generate the question 1106 and a series of possible response for the question 1106 based on the text mining algorithm and the machine learning algorithm also described by way of FIG. 4. The evaluation 1102 may provide an option to a user to submit a response to the question 1104 and the question 1106. The evaluation 1102 may also provide the user with an option to save progress in case a user may wish to abort the questionnaire session and continue with the same at a later date. The question 1104 and the question 1106 may be exemplary in nature, and the evaluation 1102 may include any other questions not mentioned herein.

Figure 12:
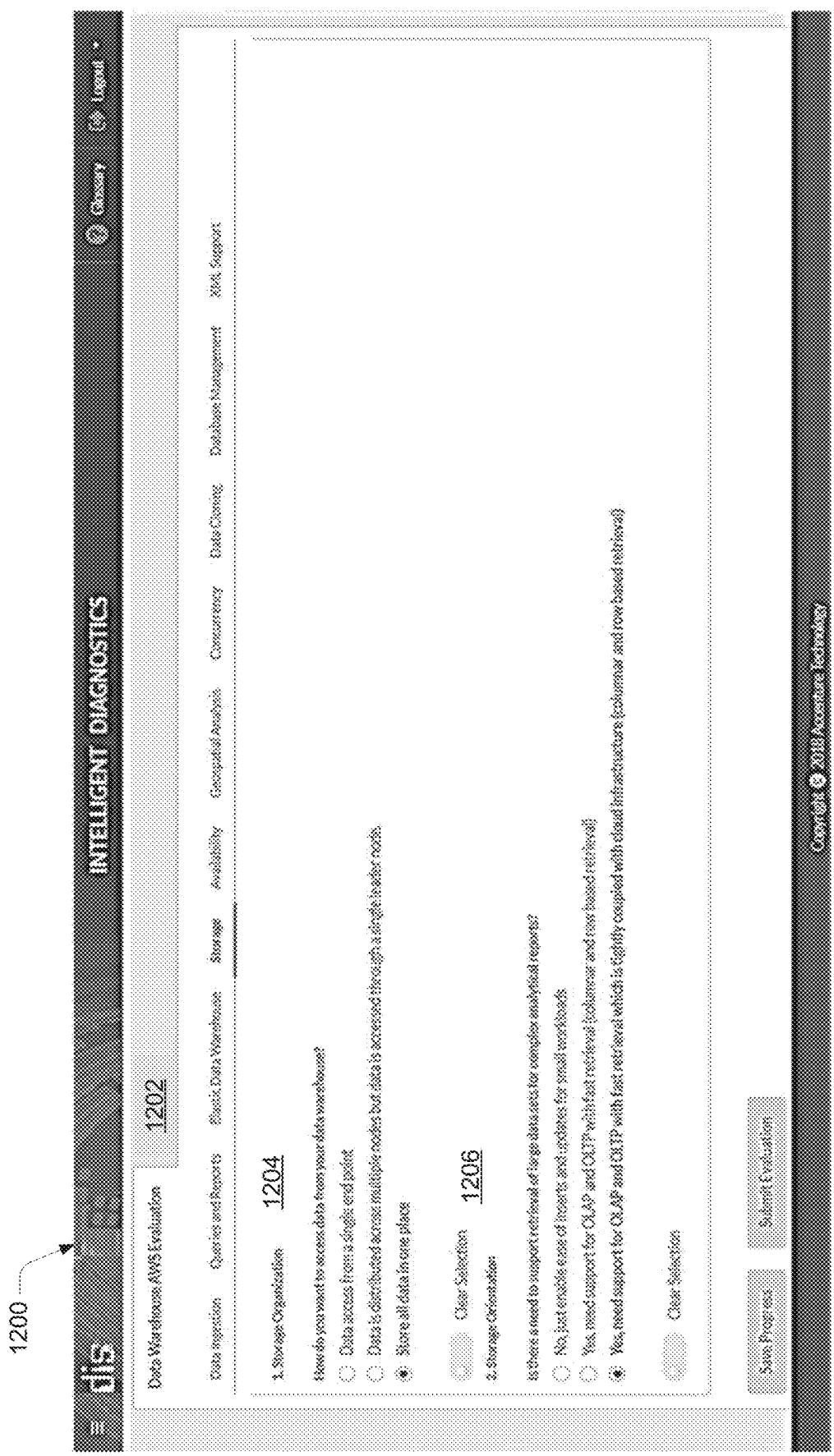
FIG. 12 illustrates a pictorial representation of an evaluation of a data warehouse platform generated by deploying a data migration system, according to an example embodiment of the present disclosure.

FIG. 12 illustrates a pictorial representation 1200 of an evaluation 1202 of a data warehouse platform generated by deploying a data migration system, according to an example embodiment of the present disclosure. Any of the components described by the way of FIGS. 1-11 may be deployed for describing the pictorial representation 1200. As also mentioned by way of FIG. 4 the assessment for the data warehouse 422 may deploy the questionnaire-based approach to capture information across various measurable parameters such as availability, concurrency, data cloning, data ingestion, database management, elastic data warehouse, geospatial analysis, queries and reports, data storage, data support and the like (as also visible in the pictorial representation 1200). In the pictorial representation 1200, the evaluation 1202 may be similar to the assessment for the data warehouse 422. The evaluation 1202 may include a question 1204 and a question 1206. The question 1204 may be related to a storage organization. The user of the system 110 may be required to answer the question 1204. The system 110 may generate the question 1204 and a series of possible response for the question 1204 based on the text mining algorithm and the machine learning algorithm also described by way of FIG. 4. The question 1206 may be related to storage orientation. The system 110 may generate the question 1206 and a series of possible response for the question 1206 based on the text mining algorithm and the machine learning algorithm also described by way of FIG. 4. The evaluation 1202 may provide an option to a user to submit a response to the question 1204 and the question 1206. The evaluation 1202 may also provide the user with an option to save progress in case a user may wish to abort the questionnaire session and continue with the same at a later date. The evaluation 1202 may provide a user of the system 110 with an option to change a response to the question 1204 or the question 1206. The question 1204 and the question 1206 may be exemplary in nature, and the evaluation 1202 may include any other questions not mentioned herein.

Figure 13:
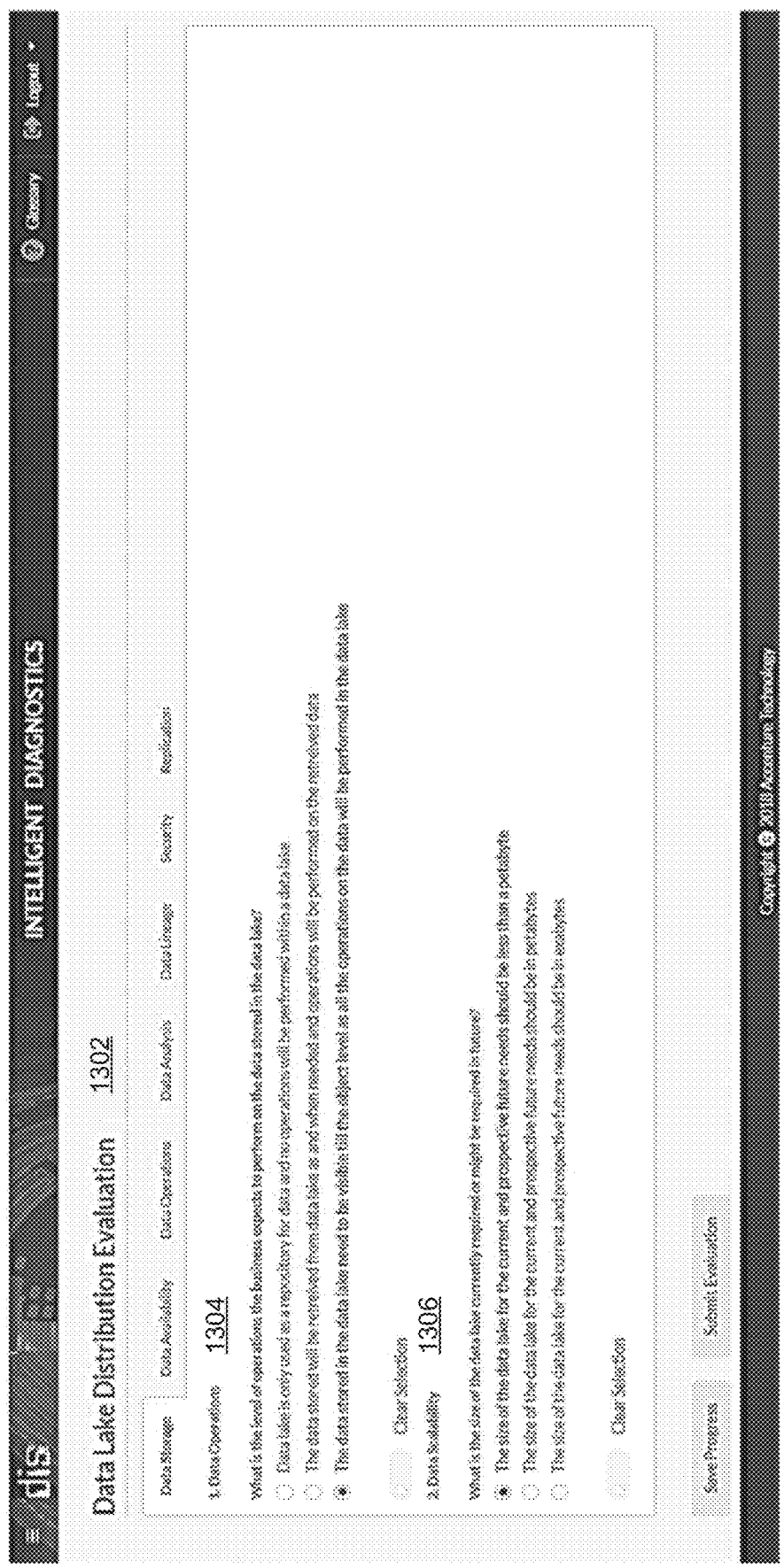
FIG. 13 illustrates a pictorial representation of an evaluation of a data lake distribution generated by deploying a data migration system, according to an example embodiment of the present disclosure.

FIG. 13 illustrates a pictorial representation 1300 of an evaluation 1302 of a data lake distribution generated by deploying a data migration system, according to an example embodiment of the present disclosure. Any of the components described by the way of FIGS. 1-12 may be deployed for describing the pictorial representation 1300. As also mentioned by the way of FIG. 4 the assessment for the data lake 426 may deploy the questionnaire-based approach to capture information across various measurable parameters such as data analysis, availability, lineage, operations, storage, replication, security, and the like (as also visible in the pictorial representation 1300). In the pictorial representation 1300, the evaluation 1302 may be same as the assessment for the data lake 426. The evaluation 1302 may include a question 1304 and a question 1306. The question 1304 may be related to data operations. The user of the system 110 may be required to answer the question 1304. The system 110 may generate the question 1304 and a series of possible response for the question 1304 based on the text mining algorithm and the machine learning algorithm also described by way of FIG. 4. The question 1306 may be related to data scalability. The system 110 may generate the question 1306 and a series of possible response for the question 1306 based on the text mining algorithm and the machine learning algorithm also described by way of FIG. 4. The evaluation 1302 may provide an option to a user to submit a response to the question 1304 and the question 1306. The evaluation 1302 may also provide the user with an option to save progress in case a user may wish to abort the questionnaire session and continue with the same at a later date. The evaluation 1302 may provide a user of the system 110 with an option to change a response to the question 1304 or the question 1306. The question 1304 and the question 1306 may be exemplary in nature, and the evaluation 1302 may include any other questions not mentioned herein.

Figure 14:
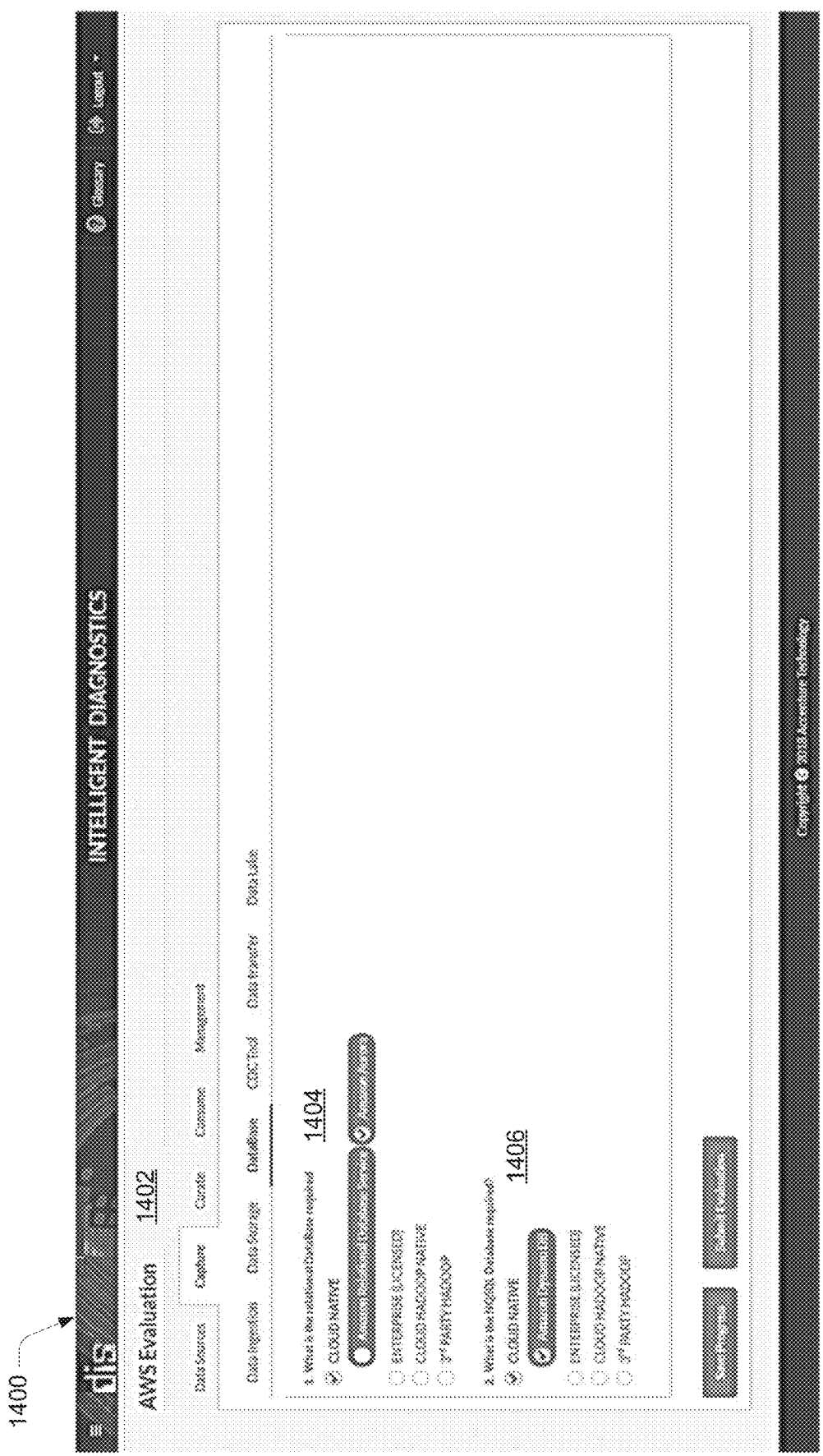
FIG. 14 illustrates a pictorial representation of an evaluation of an Amazon Web Services™ (AWS) cloud platform generated by deploying a data migration system, according to an example embodiment of the present disclosure.

FIG. 14 illustrates a pictorial representation 1400 of an evaluation 1402 of an Amazon Web Services™ (AWS) cloud platform generated by deploying a data migration system, according to an example embodiment of the present disclosure. Any of the components described by the way of FIGS. 1-13 may be deployed for describing the pictorial representation 1400. The evaluation 1402 may include a question 1404 and a question 1406. The question 1404 may be related to a native cloud platform. The user of the system 110 may be required to answer the question 1404. The system 110 may generate the question 1404 and a series of possible response for the question 1404 based on the text mining algorithm and the machine learning algorithm also described by way of FIG. 4. The question 1406 may be related to a native cloud platform. The system 110 may generate the question 1406 and a series of possible response for the question 1406 based on the text mining algorithm and the machine learning algorithm also described by way of FIG. 4. The evaluation 1402 may provide an option to a user to submit a response to the question 1404 and the question 1406. The evaluation 1402 may also provide the user with an option to save progress in case a user may wish to abort the questionnaire session and continue with the same at a later date. The evaluation 1402 may provide a user of the system 110 with an option to change a response to the question 1404 or the question 1406. The question 1404 and the question 1406 may be exemplary in nature, and the evaluation 1402 may include any other questions not mentioned herein.

Figure 15:
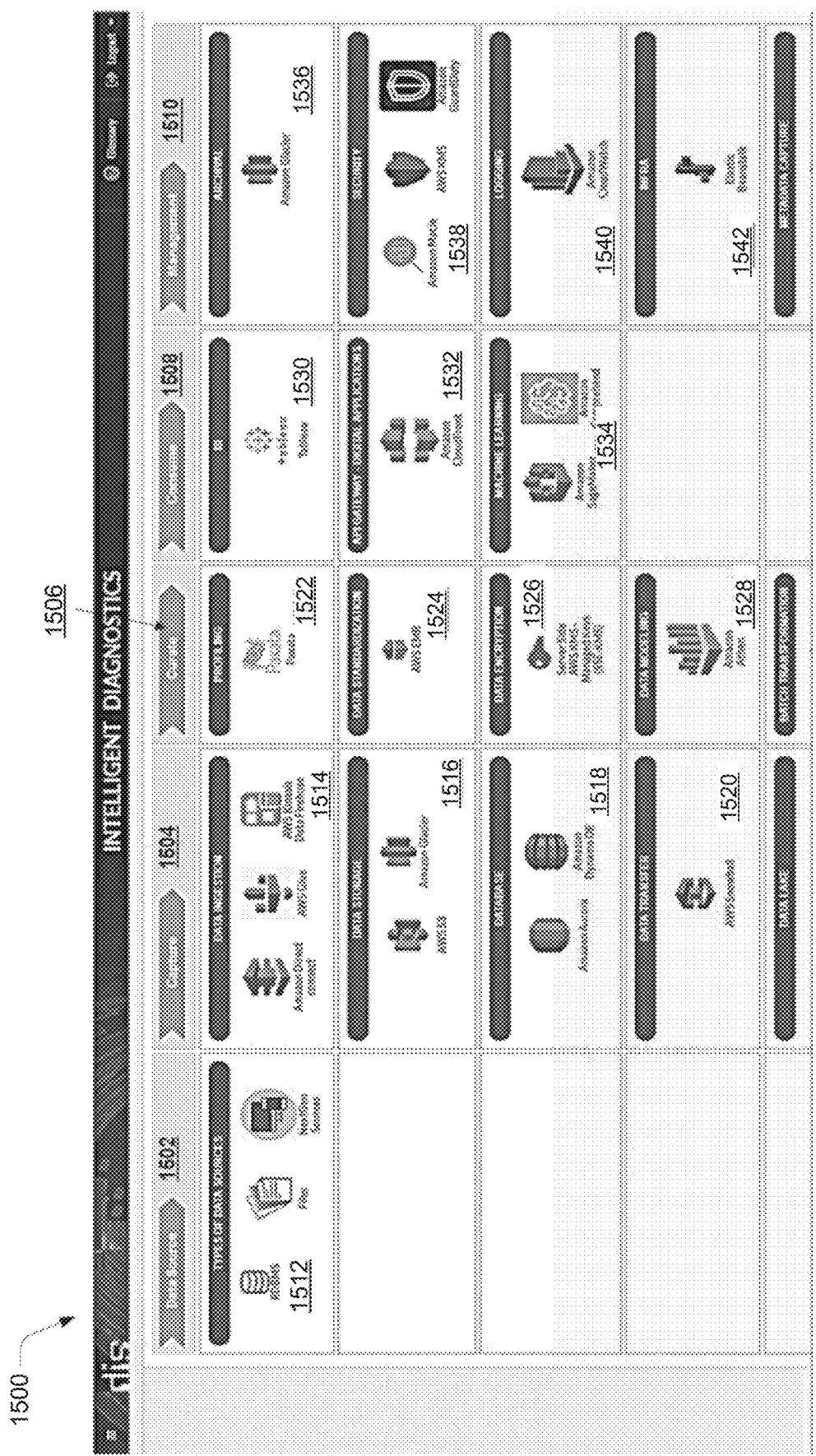
FIG. 15 illustrates a pictorial representation of a data migration output generated by a data migration system, according to an example embodiment of the present disclosure.

FIG. 15 illustrates a pictorial representation of a data migration output 1500 generated by the data migration system 110 for data migration, according to an example embodiment of the present disclosure. Any of the components described by the way of FIGS. 1-14 may be deployed for describing the pictorial representation 1500. The data migration output 1500 may be a complete graphical representation of the cloud-based tools for the entire data supply chain across various layers like capturing information, curating the information, consuming the information for processing the data migration requirement 205 and management layers. The data migration output 1500 may include an interactive questionnaire across the capture, curate, consume, and data sources and management areas. The questions may be at a detailed physical design level and may provide the flexibility to a user to choose between the cloud native, enterprise tool and Cloud Hadoop native option, based on the selection the recommended service/tools that may be displayed which are suitable for the architecture based on the data migration requirement 205. The data migration output 1500 may include a data source 1502, a data capturing component 1504, a data curating component 1506, a data consuming component 1508, and a data management component 1510. The data source 1502 may include a set of databases 1512. The set of databases may be the data associated with the data migration requirement 205.

The data capturing component 1504 a data ingestion component 1514, a data storage component 1516, a database component 1518, and a data transfer component 1520. The data curating component 1506 may include a profiling component 1522, a data standardization component 1524, a data encryption component 1526, and a data modeling component 1528. The data-consuming component 1508 may include an intelligence component 1530, a digital application gateway 1532, a machine learning component 1534. The data management component 1510 may include a data archive 1536, a data security layer 1538, a data access layer 1540, and a data infrastructure 1542.

Figure 16A:
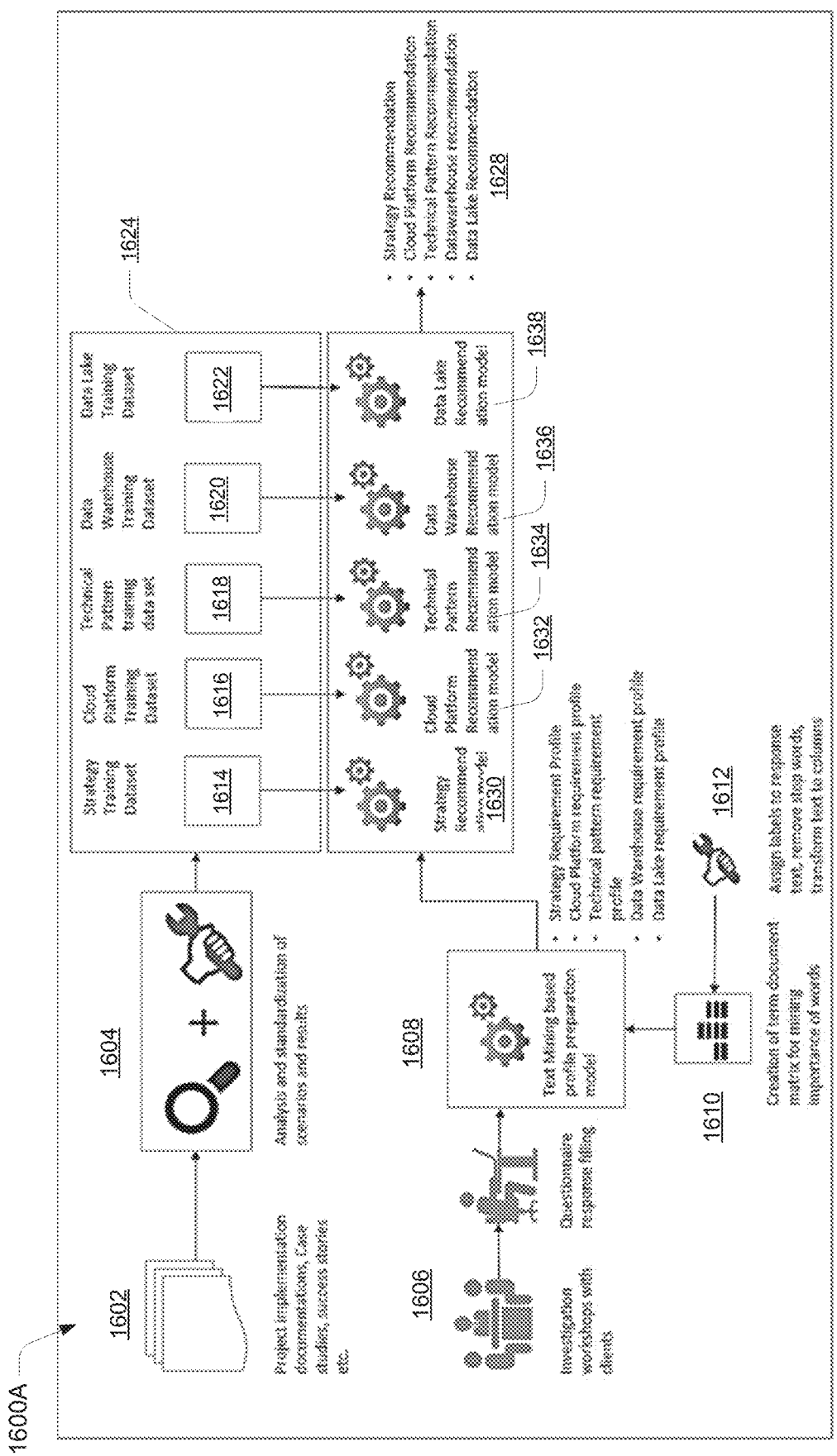
FIG. 16A illustrates a pictorial representation of the working of a data migration system at various stages of a data migration process, according to an example embodiment of the present disclosure.
Figure 16E:
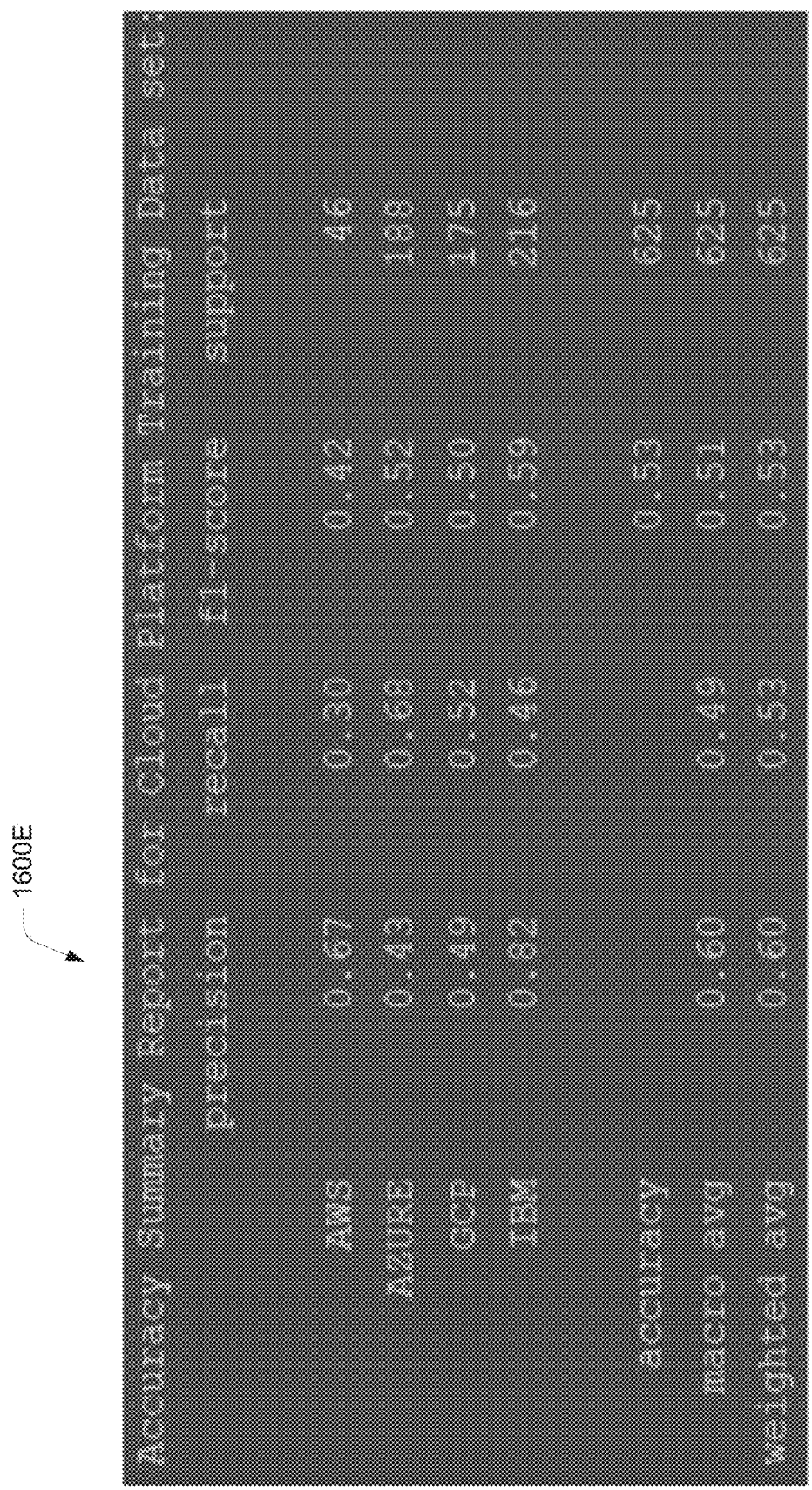
FIG. 16E illustrates a pictorial representation of the working of a data migration system at a cloud profile generation stage for processing a data migration requirement, according to an example embodiment of the present disclosure.
Figure 16J:
FIG. 16J illustrates a pictorial representation of the working of a data migration system at a data lake profile generation stage for processing a data migration requirement, according to an example embodiment of the present disclosure.

FIG. 16A illustrates a pictorial representation 1600 of a comprehensive working of the data migration system 110 at various stages of a data migration process, according to an example embodiment of the present disclosure. FIG. 16B illustrates a pictorial representation 1600B of a comprehensive working of a data migration system at a strategy profile generation stage for processing a data migration requirement, according to an example embodiment of the present disclosure. FIG. 16C illustrates a pictorial representation 1600C of a comprehensive working of a data migration system at a strategy profile generation stage for processing a data migration requirement, according to an example embodiment of the present disclosure. FIG. 16D illustrates a pictorial representation 1600D of a comprehensive working of a data migration system at a cloud profile generation stage for processing a data migration requirement, according to an example embodiment of the present disclosure. FIG. 16E illustrates a pictorial representation 1600E of a comprehensive working of a data migration system at a cloud profile generation stage for processing a data migration requirement, according to an example embodiment of the present disclosure. FIG. 16F illustrates a pictorial representation 1600F of a comprehensive working of a data migration system at a technical platform profile generation stage for processing a data migration requirement, according to an example embodiment of the present disclosure. FIG. 16G illustrates a pictorial representation 1600G of a comprehensive working of a data migration system at a technical platform profile generation stage for processing a data migration requirement, according to an example embodiment of the present disclosure. FIG. 16H illustrates a pictorial representation 1600H of a comprehensive working of a data migration system at a data warehouse profile generation stage for processing a data migration requirement, according to an example embodiment of the present disclosure. FIG. 16I illustrates a pictorial representation 1600I of a comprehensive working of a data migration system at a data warehouse profile generation stage for processing a data migration requirement, according to an example embodiment of the present disclosure. FIG. 16J illustrates a pictorial representation 1600J of a comprehensive working of a data migration system at a data lake profile generation stage for processing a data migration requirement, according to an example embodiment of the present disclosure. FIG. 16K illustrates a pictorial representation 1600K of a comprehensive working of a data migration system at a data lake profile generation stage for processing a data migration requirement, according to an example embodiment of the present disclosure. FIG. 16L illustrates a pictorial representation 1600L of a classification model deployed by a data migration system for a data migration process, according to an example embodiment of the present disclosure. Any of the components described by the way of FIGS. 1-15 may be deployed for describing the pictorial representation 1600A-1600L. For the sake, of brevity and technical clarity, the FIGS. 1600B-1600L may be described along with the FIG. 1600A. The system 110 may include a dataset 1602 including all documents, case studies and the like to be migrated onto a compatible cloud platform from an on-premise data warehouse 210. The dataset 1602 may undergo an analysis 1604 for standardization. The analysis 1604 may lead to formation of datasets 1624 for producing various recommendations as mentioned by description of the inspection 404 by way of FIG. 4.

The datasets may include a strategy training dataset 1614, a cloud platform training dataset 1616, a technical pattern training dataset 1618, a data warehouse training dataset 1620, a data lake training dataset 1622. The training datasets may be datasets, which may be sanitized by a user and may be used by the system 110 for implementing the machine learning algorithm. The strategy training dataset 1614 may include various measurable parameters along with their labels like the modernization 434, the extension 432, and the redesigning 436. In an example, the measurable parameters for the training dataset 1614 may include ecosystem collaboration, flexibility of capability reduction, flexibility of scale, geographic expansion of business, resource mix, cloud bursting, ecosystem collaboration, regulatory compliance, system idle time, workload usage, and the like. The analysis 1604 may standardize the training dataset 1614 into representing high, medium and low priority based on the requirements specified by the client and may assign a label from amongst the modernization 434, the extension 432, and the redesign 436 to the strategy training dataset 1614. For example, the strategy training dataset 1614 may include a user sanitized dataset used for migration to a data cloud from last 3 years. In an example, the system 110 may compile the strategy training dataset 1614 into 5 different training data sets as illustrated by the FIG. 1600B. The system 110 may assign priority labels as described by way of FIG. 4 to the strategy training dataset 1614. The values presented in the FIG. 1600B may be standardized to 1/2/3 representing high, medium and low priority based on the requirements specified by the client and label represented as to the decision that was implemented for the strategy training dataset 1614. The pictorial representation 1600B may be analyzed by the system 110 using a K-nearest neighbor classifier model as depicted by the pictorial representation 1600C by the way of FIG. 1600C for calculating a prediction accuracy for a label amongst the modernization 434, the extension 432, and the redesign 436 for the strategy assessment 420 on a real time basis.

The cloud platform training dataset 1616 may include labels like AWS™, Azure™, GCP™, IBM™. The cloud platform training dataset 1616 may include measurable parameters, for example, cloud geographic presence, cloud administration, cloud volumetric analysis, cloud storage & computation, cloud back up services, cloud vendor, cloud vendor interoperability, cloud artificial intelligence, data warehouse pattern, data supply chain. The analysis 1604 may standardize the cloud platform training dataset 1616 into representing high, medium and low priority based on the requirements specified by the client and label represented as to the decision from the AWS™, Azure™, GCP™, IBM™. For example, the cloud platform training dataset 1616 may include a user sanitized dataset used for migration to a data cloud from last 3 years. In an example, the system 110 may compile the cloud platform training dataset 1616 into 2 different training data sets as illustrated by the pictorial representation 1600D. The system 110 may assign priority labels as described by way of FIG. 4 to the cloud platform training dataset 1616. The values presented in the pictorial representation 1600D may be standardized to 1/2/3 representing high, medium and low priority based on the requirements specified by the client and labeled as the decision that was implemented for the cloud platform training dataset 1616. For example, the labels may be AWS™, Azure™, GCP™, IBM™. The pictorial representation 1600D may be analyzed by the system 110 using a K-nearest neighbor classifier model as depicted by the pictorial representation 1600C by the way of FIG. 1600E for calculating a prediction accuracy for a label amongst the AWS™, Azure™, GCP™, IBM™ for the cloud platform assessment 456 on a real time basis.

The technical pattern training dataset 1618 may include labels such as for example, the data warehouse 422, the data lake 426, and the hybrid architecture 424. The technical pattern training dataset 1618 may include measurable parameters such as for example, data formats, reports, historical data, data retention, data flexibility, data monetization. The analysis 1604 may standardize the technical pattern training dataset 1618 into representing high, medium and low priority based on the requirements specified by the client and label represented as to the decision from the labels like the data warehouse 422, the data lake 426, and the hybrid architecture 424. The data warehouse training dataset 1620 may include labels such as the traditional data warehouse 454, the native cloud data warehouse 456, and the parallel processing data warehouse 458. For example, the technical pattern training dataset 1618 may include a user sanitized dataset used for migration to a data cloud from last 3 years. In an example, the system 110 may compile the technical pattern training dataset 1618 into 2 different training data sets as illustrated by the pictorial representation 1600F. The system 110 may assign priority labels as described by way of FIG. 4 to the technical pattern training dataset 1618. The values presented in the pictorial representation 1600F may be standardized to 1/2/3 representing high, medium and low priority based on the requirements specified by the client and labeled as the decision that was implemented for the technical pattern training dataset 1618. For example, the labels may be data warehouse 422, the data lake 426, and the hybrid architecture 424. The pictorial representation 1600F may be analyzed by the system 110 using a K-nearest neighbor classifier model as depicted by the pictorial representation 1600G by the way of FIG. 1600G for calculating a prediction accuracy for a label amongst the data warehouse 422, the data lake 426, and the hybrid architecture 424 for the technical platform assessment 418 on a real time basis.

The data warehouse training dataset 1620 may include measurable factors such as availability, concurrency, data cloning, data ingestion, database management, elastic data warehouse, geospatial analysis, queries and reports, data storage, data support and the like. The analysis 1604 may standardize the data warehouse training dataset 1620 into representing high, medium and low priority based on the requirements specified by the client and label represented as to the decision from the traditional data warehouse 454, the native cloud data warehouse 456, and the parallel processing data warehouse 458. For example, the data warehouse training dataset 1620 may include a user sanitized dataset used for migration to a data cloud from last 3 years. In an example, the system 110 may compile the data warehouse training dataset 1620 into a training data set as illustrated by the pictorial representation 1600H. The system 110 may assign priority labels as described by way of FIG. 4 to the data warehouse training dataset 1620. The values presented in the pictorial representation 1600H may be standardized to 1/2/3 representing high, medium and low priority based on the requirements specified by the client and labeled as the decision that was implemented for the data warehouse training dataset 1620. For example, the labels may be the traditional data warehouse 454, the native cloud data warehouse 456, and the parallel processing data warehouse 458. The pictorial representation 1600H may be analyzed by the system 110 using a K-nearest neighbor classifier model as depicted by the pictorial representation 1600I by the way of FIG. 1600I for calculating a prediction accuracy for a label amongst the traditional data warehouse 454, the native cloud data warehouse 456, and the parallel processing data warehouse 458 for the assessment for the data warehouse 422 on a real time basis.

The data lake training dataset 1622 may include measurable factors such as data analysis, availability, lineage, operations, storage, replication, security, and the like. The data lake training dataset 1622 may include labels such as the cloud data lake 428, the third-party data lake 430, the Cloudera™ application 446, the Mapr™ application 448, and the Hortonworks™ Application 450. The analysis 1604 may standardize the data lake training dataset 1622 into representing high, medium and low priority based on the requirements specified by the client and label represented as to the decision that may have been taken for the data lake training dataset 1622 from amongst the cloud data lake 428, the third-party data lake 430, the Cloudera™ application 446, the Mapr™ application 448, and the Hortonworks™ Application 450. The data lake training dataset 1622 may include labels such as the cloud data lake 428, the third-party data lake 430, the Cloudera™ application 446, the Mapr™ application 448, and the Hortonworks™ Application 450. For example, the data lake training dataset 1622 may include a user sanitized dataset used for migration to a data cloud from last 3 years. In an example, the system 110 may compile the data lake training dataset 1622 into a training data set as illustrated by the pictorial representation 1600J. The system 110 may assign priority labels as described by way of FIG. 4 to the data lake training dataset 1622. The values presented in the pictorial representation 1600J may be standardized to 1/2/3 representing high, medium and low priority based on the requirements specified by the client and labeled as the decision that was implemented for the data lake training dataset 1622. For example, the labels may be the Cloudera™ application 446, the Mapr™ application 448, and the Hortonworks™ Application 450. The pictorial representation 1600J may be analyzed by the system 110 using a K-nearest neighbor classifier model as depicted by the pictorial representation 1600K by the way of FIG. 1600K for calculating a prediction accuracy for a label amongst the Cloudera™ application 446, the Mapr™ application 448, and the Hortonworks™ Application 450 for the assessment for the data lake 426 on a real time basis.

The system 110 may further include a workshop component 1606. The workshop component 1606 may include details collected by conducting various workshops in an organization for processing the data migration requirement 205. The workshop component 1606 may include a questionnaire response filling session. As mentioned above, the system 110 may deploy a questionnaire-based approach for capturing information for processing the data migration requirement 205. The results from the questionnaire may be processed by a text mining component 1608. The text mining component 1608 may deploy the text mining algorithm as mentioned by way of FIG. 4 to assign labels 1612 to questionnaire response and create a document matrix 1610 for mining importance of various words mentioned in the questionnaire (working of algorithm is mentioned by way of FIG. 4). The text mining-based approach may lead to creation of the strategy requirement profile, the cloud platform requirement profile, the technical platform requirement profile, the data warehouse requirement profile, the data lake requirement profile as also mentioned by way of FIG. 4. The system 110 may determine a strategy recommendation model 1630 based on the strategy training dataset 1614 and the strategy requirement profile created by the text mining component 1608. The system 110 may determine a cloud platform recommendation model 1632 based on the cloud platform training dataset 1616 and the cloud platform requirement profile created by the text mining component 1608. The system 110 may determine a technical pattern recommendation model 1634 based on the technical pattern training dataset 1618 and the technical pattern requirement profile created by the text mining component 1608. The system 110 may determine a data warehouse recommendation model 1638 based on the data warehouse training dataset 1620 and the data warehouse requirement profile created by the text mining component 1608. The system 110 may determine a data lake recommendation model 1640 based on a data lake training dataset 1622 and the data lake requirement profile created by the text mining component 1608. The strategy recommendation model 1630, cloud platform recommendation model 1632, technical pattern recommendation model 1634, data warehouse recommendation model 1638, and the data lake recommendation model 1640 may lead to determination of a recommendation set 1628. The recommendation set 1628 may include recommendations for a data migration strategy, a cloud platform, a technical platform, a data warehouse type, and a data lake structure associated with the data migration requirement 205.

The FIG. 1600L may depict a pictorial representation 1600L comprising a confusion matrix or error matrix that may be used to describe the performance of a classification model such as mentioned above on a set of test data such as the training data sets mentioned above for which the true values may be known by providing the summary of prediction results. The matrix from the pictorial representation 1600L may provide an insight into the errors being made by a classifier model and also on the types of errors may be made while generating recommendations as mentioned above. The matrix from the pictorial representation 1600L may include two classes labelled as "Positive" and "Negative". The matrix may determine four categories from the two classes labelled as "Positive" and "Negative". A first class may be labelled "True Positive" (TP). The "True Positive" class may be positive for the real time data and may be predicted to be positive for the real time data set. A second class may be labelled "False Negative" (FN). The "False Negative" class may be positive for the real time data and may be predicted to be negative for the real time data set. A third class may be labelled "True Negative" (TN). The "True Negative" class may be negative for the real time data and may be predicted to be negative for the real time data set. A fourth class may be labelled "False Positive" (FP). The "False Positive" class may be negative for the real time data and may be predicted to be positive for the real time data set. The matrix may also include a classification accuracy value determined by a relation presented below:

$$Accuracy = \frac{TP+TN}{TP+TN+FP+FN}$$

The matrix may include a recall value that may be defined as a ratio of the total number of correctly classified positive observations divide to the total number of positive observations. A high recall value may indicate that a class or a label may be correctly recognized. The recall value may be determined by a relation presented below:

$$Recall = \frac{TP}{TP+FN}$$

The matrix may include a precision value that may be determined by dividing the total number of correctly classified positive examples by the total number of predicted positive examples. A high precision value may indicate an example to be labeled as positive to indeed be positive. The precision value may be determined by a relation presented below:

$$Precision = \frac{TP}{TP+FP}$$

The matrix may include an F1 score that may be defined as a harmonic mean of precision and recall. The F1 score may be nearer to the smaller value of the precision value or the recall value. The F1 score may be determined by a relation presented below:

$$F1\text{-score} = \frac{2*Recall*precision}{Recall+Precision}$$

The matrix may further include a support that may be the number of actual occurrences of the class in the specified dataset. An imbalanced support in the training data may indicate structural weaknesses in the reported scores of the classifier and could indicate the need for stratified sampling or rebalancing. The term "training dataset" or the term "training data" mentioned above may refer to the strategy training dataset 1614, the cloud platform training dataset 1616, the technical pattern training dataset 1618, the data warehouse training dataset 1620, the data lake training dataset 1622.

Figure 17:
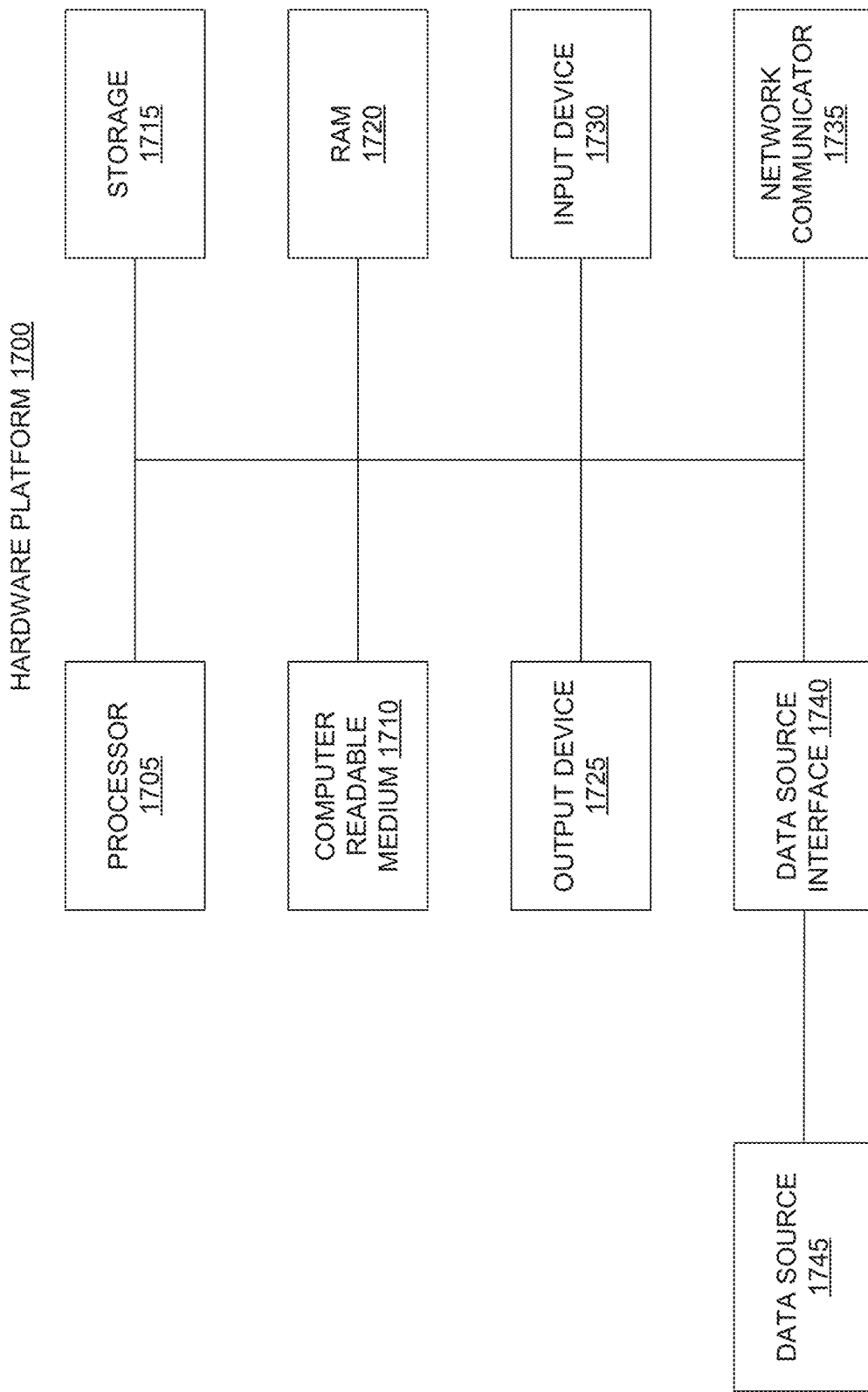
FIG. 17 illustrates a hardware platform for the implementation of a data migration system, according to an example embodiment of the present disclosure.

FIG. 17 illustrates a hardware platform 1700 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1700. The hardware platform 1700 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 17, the hardware platform 1700 may be a computer system 1700 that may be used with the examples described herein. The computer system 1700 may represent a computational platform that includes components that may be in a server or another computer system. The computer system 1700 may execute, by a processor (e.g., a single or multiple processors) or other hardware processing circuit, the methods, functions and other processes described herein.

These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1700 may include a processor 1705 that executes software instructions or code stored on a non-transitory computer-readable storage medium 1710 to perform methods of the present disclosure. The software code includes, for example, instructions to gather data and documents and analyze documents. In an example, the data assembler 130, the data analyzer 140, the data migration predictor 150, and the modeler 160 may be software codes or components performing these steps.

The instructions on the computer-readable storage medium 1710 are read and stored the instructions in storage 1715 or in random access memory (RAM) 1720. The storage 1715 provides a large space for keeping static data where at least some instructions could be stored for later execution. The stored instructions may be further compiled to generate other representations of the instructions and dynamically stored in the RAM 1720. The processor 1705 reads instructions from the RAM 1720 and performs actions as instructed.

The computer system 1700 further includes an output device 1725 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1700 further includes input device 1730 to provide a user or another device with mechanisms for entering data and/or otherwise interact with the computer system 1700. The input device may include, for example, a keyboard, a keypad, a mouse, or a touchscreen. In an example, the output of the modeler 160 may be displayed on the output device 1725. Each of these output devices 1725 and input devices 1730 could be joined by one or more additional peripherals. In an example, the output device 1725 may be used to display the results of the data migration requirement 205.

A network communicator 1735 may be provided to connect the computer system 1700 to a network and in turn to other devices connected to the network including other clients, servers, data stores, and interfaces, for instance. A network communicator 1735 may include, for example, a network adapter such as a LAN adapter or a wireless adapter. The computer system 1700 includes a data source interface 1740 to access data source 1745. A data source is an information resource. As an example, a database of exceptions and rules may be a data source. Moreover, knowledge repositories and curated data may be other examples of data sources.

Figure 18A:
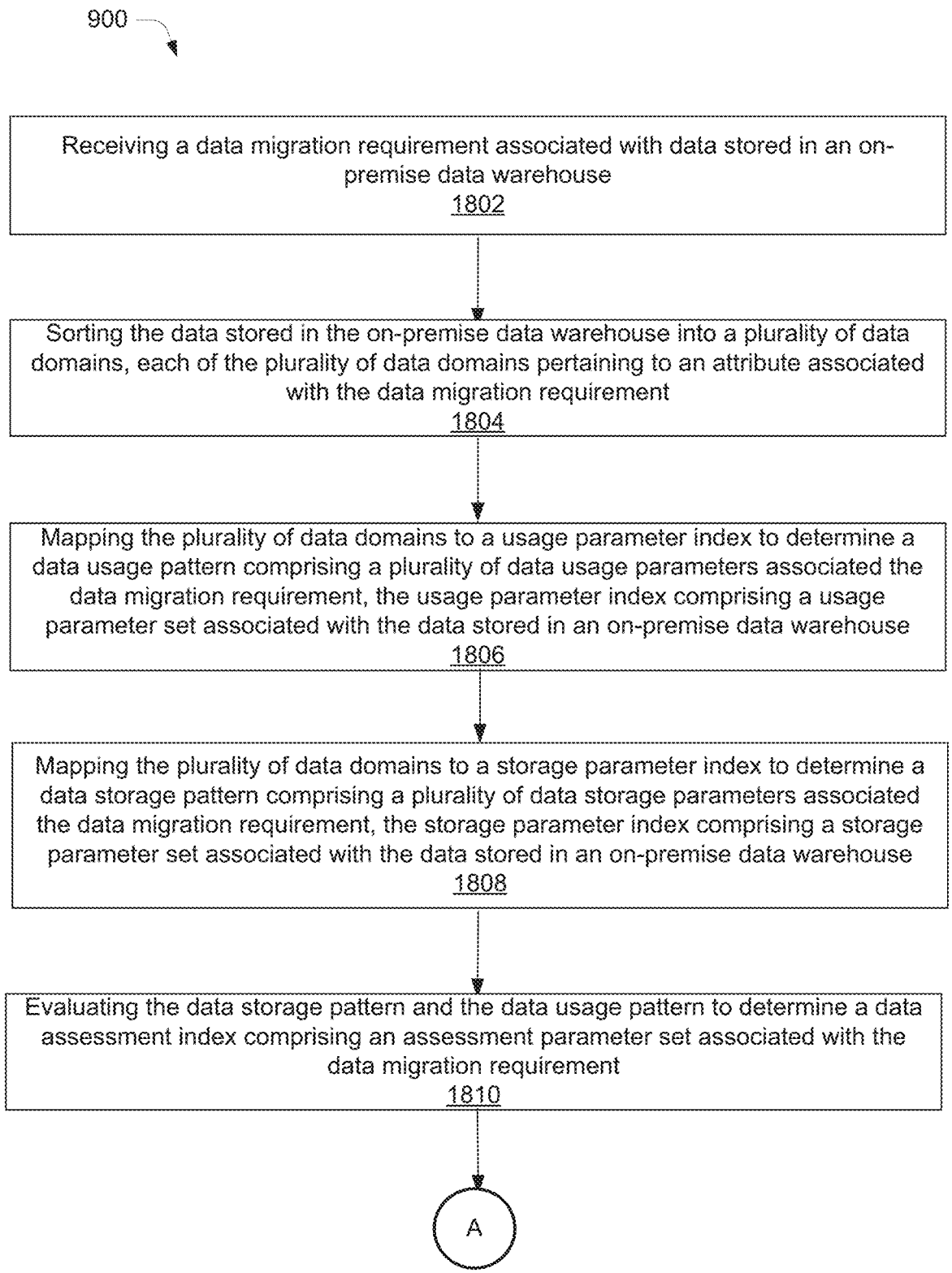
FIGS. 18A and 18B illustrate a process flowchart for data migration using a data migration system, according to an example embodiment of the present disclosure.
Figure 18B:
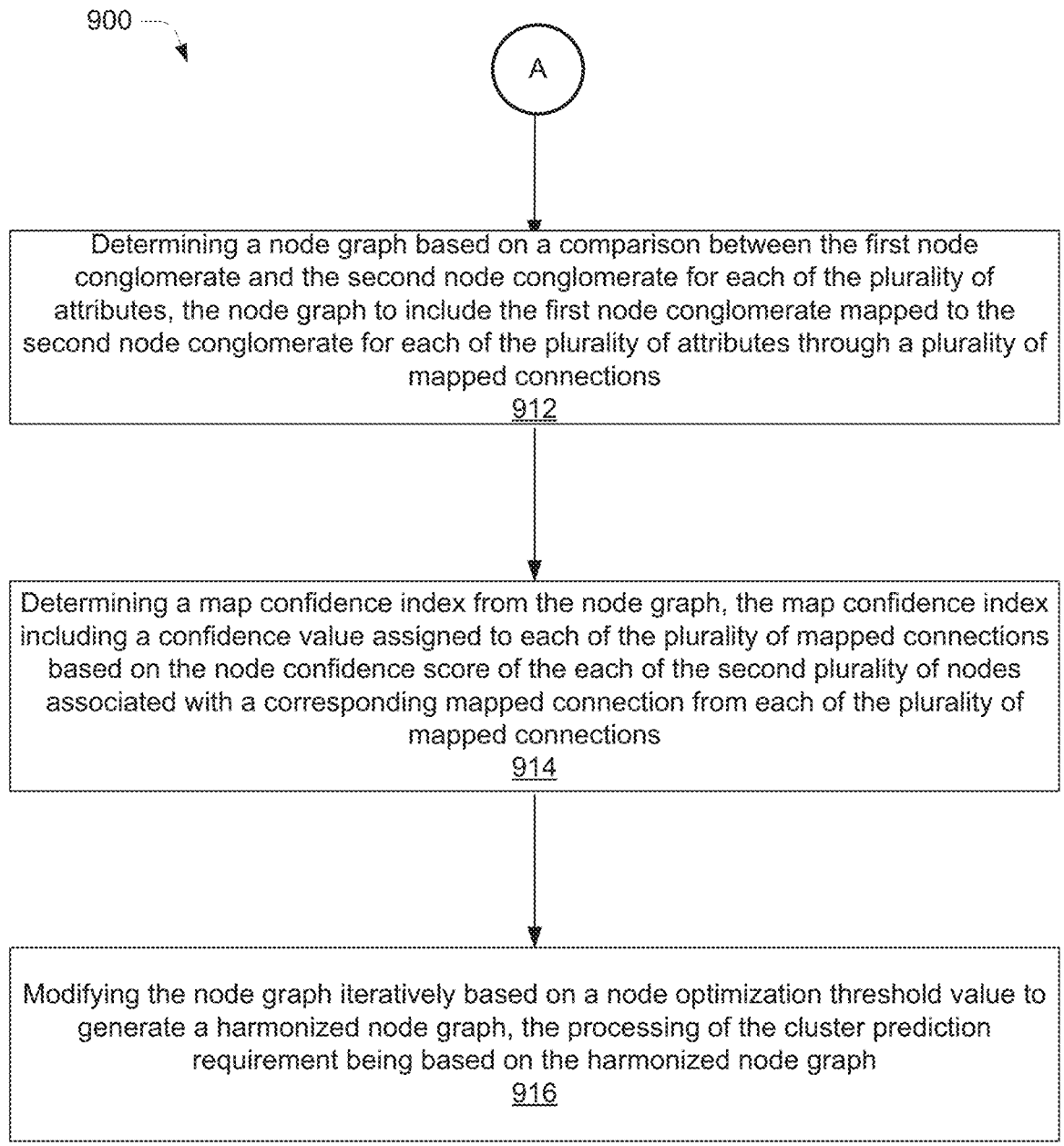

FIGS. 18A and 18B illustrate a process flowchart for data migration using a data migration system, according to an example embodiment of the present disclosure.

It should be understood that method steps are shown here for reference only and other combinations of the steps may be possible. Further, the method 1800 may contain some steps in addition to the steps shown in FIG. 18. For the sake of brevity, construction and operational features of the system 110 which are explained in detail in the description of FIGS. 1-17 are not explained in detail in the description of FIG. 18. The method 1800 may be performed by a component of the system 110, such as the processor 120, the data assembler 130, the data analyzer 140, the data migration predictor 150 and the modeler 160.

At block 1802, the data migration requirement 205 may be received by a processor. The data migration requirement 205 may be associated with data stored in an on-premise data warehouse 210.

At block 1804, the data stored in the on-premise data warehouse 210 may be sorted by the processor, into a plurality of data domains 215. In an example, each of the plurality of data domains 215 may be pertaining to an attribute 220 associated with the data migration requirement 205.

At block 1806, the plurality of data domains 215 may be mapped by a processor, to a usage parameter index 225 to determine a data usage pattern 235 comprising a plurality of data usage parameters 240 associated the data migration requirement 205. The usage parameter index 225 may be comprising a usage parameter set 290 associated with the data stored in an on-premise data warehouse 210.

At block 1808, the plurality of data domains 215 may be mapped by a processor, to a storage parameter index 230 to determine a data storage pattern 245 comprising a plurality of data storage parameters 250 associated the data migration requirement 205. The storage parameter index 230 may be comprising a storage parameter set 285 associated with the data stored in an on-premise data warehouse 210. In an example, a usage questionnaire may be generated based on the usage parameter set 290 and a storage questionnaire based on the storage parameter set 285 to map the plurality of data domains 215 to the data usage index and the data storage index, respectively. A questionnaire library may be created for recording the usage questionnaire and the storage questionnaire, the questionnaire library being deployed to update the usage parameter index 225, and the storage parameter index 230. In an example, a confidence value may be assigned to each of the plurality of data domains 215 based on the data migration requirement 205 to determine an order of mapping the plurality of data domains 215 with the usage parameter index 225 and the storage parameter index 230, respectively.

At block 1810, the data storage pattern 245 and the data usage pattern 235 may be evaluated by a processor, to determine a data assessment index 260 comprising an assessment parameter set 295 associated with the data migration requirement 205. The data storage pattern 245 and the data usage pattern 235 may be evaluated by the implementation of the first cognitive learning operation 255 by the processor. In an example, the data usage pattern 235 and the data storage pattern 245 may be generated as an electronic document to a user. In an example, user input may be received to the electronic document for determining the data assessment index 260.

At block 1812, a data migration index 298 may be determined based on a mapping a plurality of cloud platforms 265 to the data assessment index 260. The data migration index 298 may be comprising each of the plurality of cloud platforms 265 mapped to the data assessment index 260. In an example, the processor may implement the first cognitive learning operation 255 for determining the data migration index 298 based on mapping a plurality of cloud platforms 265 to the data assessment index 260. In an example, the first cognitive learning operation 255 may be implemented to determine the data assessment index 260 including a data migration strategy, a cloud platform, a technical platform, a data warehouse type, and a data lake structure associated with the data migration requirement 205. In an example, the data migration index 298 may be generated as an interactive electronic document to receive a migration input from a user. The process 1800 may further include implementing the second cognitive learning operation 270, by the processor, on the migration input to determine the data migration model 275 compatible with the data assessment index 260.

At block 1814, a second cognitive learning operation 270 may be implemented to determine a data migration model 275 compatible with the data assessment index 260, based on the data migration index 298. The data migration model 275 may be comprising a layout for transferring data stored in the on-premise data warehouse 210 to a cloud platform from the plurality of cloud platforms 265.

At block 1816, a data migration output 280 may be generated comprising the layout for transferring data stored in the on-premise data warehouse 210 to a compatible cloud platform from the plurality of cloud platforms 265 to resolve the data migration requirement 205.

In an example, the method 1800 may be practiced using a non-transitory computer-readable medium. In an example, the method 1800 may be a computer-implemented method.

The present disclosure provides for a data migration system, which may generate a roadmap for data migration from an on-premise data warehouse 210 to a compatible cloud platform while incurring minimal costs. Furthermore, the present disclosure may categorically analyze various parameters that may have an impact on the preparation of a roadmap for movement of on-premise data to cloud.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
  a processor;
  a data assembler coupled to the processor, the data assembler to:
    receive a data migration requirement associated with data stored in an on-premise data warehouse; and
    sort the data stored in the on-premise data warehouse into a plurality of data domains, each of the plurality of data domains pertaining to an attribute associated with the data migration requirement;
  a data analyzer coupled to the processor, the data analyzer to:
    map the plurality of data domains to a usage parameter index to determine a data usage pattern comprising a plurality of data usage parameters associated the data migration requirement, the usage parameter index comprising a usage parameter set associated with the data stored in an on-premise data warehouse; and
    map the plurality of data domains to a storage parameter index to determine a data storage pattern comprising a plurality of data storage parameters associated the data migration requirement, the storage parameter index comprising a storage parameter set associated with the data stored in an on-premise data warehouse;
  a data migration predictor coupled to the processor, the data migration predictor to implement a first cognitive learning operation to:
    evaluate the data storage pattern and the data usage pattern to determine a data assessment index comprising an assessment parameter set associated with the data migration requirement; and
    determine a data migration index based on mapping a plurality of cloud platforms to the data assessment index, the data migration index comprising each of the plurality of cloud platforms mapped to the data assessment index; and
  a modeler coupled to the processor, the modeler to:
    implement a second cognitive learning operation to determine a data migration model compatible with the data assessment index, based on the data migration index, the data migration model comprising a layout for transferring data stored in the on-premise data warehouse to a cloud platform from the plurality of cloud platforms; and
    generate a data migration output comprising the layout for transferring data stored in the on-premise data warehouse to a compatible cloud platform from the plurality of cloud platforms to resolve the data migration requirement.

2. The system as claimed in claim 1, wherein the data migration predictor implements the first cognitive learning operation to determine the data assessment index including a data migration strategy, a cloud platform, a technical platform, a data warehouse type, and a data lake structure associated with the data migration requirement.

3. The system as claimed in claim 1, wherein the data analyzer:
  generates the data usage pattern and the data storage pattern as an electronic document to a user; and
  receives a user input to the electronic document for determining the data assessment index.

4. The system as claimed in claim 1, wherein the data analyzer generates a usage questionnaire based on the usage parameter set and a storage questionnaire based on the storage parameter set to map the plurality of data domains to the data usage index and the data storage index, respectively.

5. The system as claimed in claim 4, wherein the data analyzer creates a questionnaire library for recording the usage questionnaire and the storage questionnaire, the questionnaire library being deployed to update the usage parameter index, and the storage parameter index.

6. The system as claimed in claim 1, wherein the data analyzer assigns a confidence value to each of the plurality of data domains based on the data migration requirement to determine an order of mapping the plurality of data domains with the usage parameter index and the storage parameter index, respectively.

7. The system as claimed in claim 1, wherein the modeler:
  generates the data migration index as an interactive electronic document to receive a migration input from a user, and
  implements the second cognitive learning operation on the migration input to determine the data migration model compatible with the data assessment index.

8. A method comprising:
  receiving, by a processor, a data migration requirement associated with data stored in an on-premise data warehouse;
  sorting, by the processor, the data stored in the on-premise data warehouse into a plurality of data domains, each of the plurality of data domains pertaining to an attribute associated with the data migration requirement;

mapping, by the processor, the plurality of data domains to a usage parameter index to determine a data usage pattern comprising a plurality of data usage parameters associated the data migration requirement, the usage parameter index comprising a usage parameter set associated with the data stored in an on-premise data warehouse;

mapping, by the processor, the plurality of data domains to a storage parameter index to determine a data storage pattern comprising a plurality of data storage parameters associated the data migration requirement, the storage parameter index comprising a storage parameter set associated with the data stored in an on-premise data warehouse;

evaluating, by the processor, the data storage pattern and the data usage pattern to determine a data assessment index comprising an assessment parameter set associated with the data migration requirement;

determining, by the processor, a data migration index based on mapping a plurality of cloud platforms to the data assessment index, the data migration index comprising each of the plurality of cloud platforms mapped to the data assessment index;

implementing, by the processor, a second cognitive learning operation to determine a data migration model compatible with the data assessment index, based on the data migration index, the data migration model comprising a layout for transferring data stored in the on-premise data warehouse to a cloud platform from the plurality of cloud platforms; and generating, by the processor, a data migration output comprising the layout for transferring data stored in the on-premise data warehouse to a compatible cloud platform from the plurality of cloud platforms to resolve the data migration requirement.

9. The method as claimed in claim 8, wherein the method further comprises implementing, by the processor, the first cognitive learning operation to determine the data assessment index including a data migration strategy, a cloud platform, a technical platform, a data warehouse type, and a data lake structure associated with the data migration requirement.

10. The method as claimed in claim 8, wherein the method further comprises:
generating, by the processor, the data usage pattern and the data storage pattern as an electronic document to a user; and
receiving, by the processor, a user input to the electronic document for determining the data assessment index.

11. The method as claimed in claim 8, wherein the method further comprises generating, by the processor, a usage questionnaire based on the usage parameter set and a storage questionnaire based on the storage parameter set to map the plurality of data domains to the data usage index and the data storage index, respectively.

12. The method as claimed in claim 11, wherein the method further comprises creating, by the processor, a questionnaire library for recording the usage questionnaire and the storage questionnaire, the questionnaire library being deployed to update the usage parameter index, and the storage parameter index.

13. The method as claimed in claim 8, wherein the method further comprises assigning, by the processor, a confidence value to each of the plurality of data domains based on the data migration requirement to determine an order of mapping the plurality of data domains with the usage parameter index and the storage parameter index, respectively.

14. The method as claimed in claim 1, wherein the method further comprises:
generating, by the processor, the data migration index as an interactive electronic document to receive a migration input from a user; and
implementing, by the processor, the second cognitive learning operation on the migration input to determine the data migration model compatible with the data assessment index.

15. A non-transitory computer readable medium including machine readable instructions that are executable by a processor to:
receive a data migration requirement associated with data stored in an on-premise data warehouse;
sort the data stored in the on-premise data warehouse into a plurality of data domains, each of the plurality of data domains pertaining to an attribute associated with the data migration requirement;
map the plurality of data domains to a usage parameter index to determine a data usage pattern comprising a plurality of data usage parameters associated the data migration requirement, the usage parameter index comprising a usage parameter set associated with the data stored in an on-premise data warehouse;
map the plurality of data domains to a storage parameter index to determine a data storage pattern comprising a plurality of data storage parameters associated the data migration requirement, the storage parameter index comprising a storage parameter set associated with the data stored in an on-premise data warehouse;
evaluate the data storage pattern and the data usage pattern to determine a data assessment index comprising an assessment parameter set associated with the data migration requirement;
determine a data migration index based on mapping a plurality of cloud platforms to the data assessment index, the data migration index comprising each of the plurality of cloud platforms mapped to the data assessment index;
implement a second cognitive learning operation to determine a data migration model compatible with the data assessment index, based on the data migration index, the data migration model comprising a layout for transferring data stored in the on-premise data warehouse to a cloud platform from the plurality of cloud platforms; and
generate a data migration output comprising the layout for transferring data stored in the on-premise data warehouse to a compatible cloud platform from the plurality of cloud platforms to resolve the data migration requirement.

16. The non-transitory computer-readable medium of claim 15, wherein the processor is to implement the first cognitive learning operation to determine the data assessment index including a data migration strategy, a cloud platform, a technical platform, a data warehouse type, and a data lake structure associated with the data migration requirement.

17. The non-transitory computer-readable medium of claim 15, wherein the processor is to:
generate the data usage pattern and the data storage pattern as an electronic document to a user, and
receive a user input to the electronic document for determining the data assessment index.

18. The non-transitory computer-readable medium of claim 15, wherein the processor is to generate a usage questionnaire based on the usage parameter set and a storage questionnaire based on the storage parameter set to map the plurality of data domains to the data usage index and the data storage index, respectively.

19. The non-transitory computer-readable medium of claim 18, wherein the processor is to create a questionnaire library for recording the usage questionnaire and the storage questionnaire, the questionnaire library being deployed to update the usage parameter index, and the storage parameter index.

20. The non-transitory computer-readable medium of claim 19, wherein the processor is to assign a confidence value to each of the plurality of data domains based on the data migration requirement to determine an order of mapping the plurality of data domains with the usage parameter index and the storage parameter index, respectively.

* * * * *